Feb. 28, 1961 J. A. MAURER, JR 2,972,928

IMAGE MOTION COMPENSATION MECHANISMS IN AERIAL CAMERAS

Filed Nov. 9, 1956 11 Sheets-Sheet 1

INVENTOR.

John A. Maurer Jr

By [signature]

ATTORNEY

Feb. 28, 1961 J. A. MAURER, JR 2,972,928

IMAGE MOTION COMPENSATION MECHANISMS IN AERIAL CAMERAS

Filed Nov. 9, 1956 11 Sheets-Sheet 2

INVENTOR.

John A. Maurer, Jr.

By [signature]

ATTORNEY

INVENTOR.
John A. Maurer, Jr.
By [signature]
ATTORNEY

Feb. 28, 1961 J. A. MAURER, JR 2,972,928

IMAGE MOTION COMPENSATION MECHANISMS IN AERIAL CAMERAS

Filed Nov. 9, 1956 11 Sheets-Sheet 4

INVENTOR.

John A. Maurer, Jr.

By [signature]

ATTORNEY

INVENTOR.
John A. Maurer Jr.
BY
[signature]
ATTORNEY

INVENTOR.
John A. Maurer, Jr.
By [signature]
ATTORNEY

IMAGE MOTION COMPENSATION MECHANISMS IN AERIAL CAMERAS

Filed Nov. 9, 1956

INVENTOR.
John A. Maurer, Jr.,
BY [signature]
ATTORNEY

INVENTOR.
John A. Maurer Jr
BY
[signature]
ATTORNEY

INVENTOR.
John A. Maurer, Jr.
BY [signature]
ATTORNEY

INVENTOR.
John A. Maurer Jr.
By [signature]
ATTORNEY

INVENTOR.
John A. Maurer, Jr.,
By [signature]
Attorney

United States Patent Office 2,972,928 Patented Feb. 28, 1961

2,972,928

IMAGE MOTION COMPENSATION MECHANISMS IN AERIAL CAMERAS

John Andrew Maurer, Jr., 320 W. 86th St., New York 24, N.Y.

Filed Nov. 9, 1956, Ser. No. 621,288

3 Claims. (Cl. 88—18.3)

This invention relates to improvements in aerial cameras, and more specifically to means for providing image motion compensation in such cameras.

When a photograph is taken from an airplane, the motion of the latter, relative to the object being photographed, results in a motion of the image of the object in the focal plane of the camera. This motion, in the case of a modern airplane flying at an altitude suitable for photography, is commonly in the range of 1 inch to 8 inches per second, but in extreme cases involving very high speeds at low altitudes, the motion may reach velocities as high as 30 inches per second. Unless corrective steps are taken, these motions of the image relative to the sensitive material in the focal plane of the camera result in appreciable blurring of the photograph.

This occurs because the exposures which it is feasible to give, consistent with the limitations of available shutter mechanisms and the requirement of adequate exposure of the sensitive material, are generally not of short enough duration to limit the image movement relative to the sensitive material during the exposure to an amount small enough not to produce objectionable blurring.

In cases where photographs of a high standard of definition are desired, therefore, it is necessary to provide means for reducing the relative motion between the image and the sensitive material, or for eliminating it altogether. This may be accomplished by moving, during the exposure, at the proper velocity, either the sensitive material in the direction of flight of the airplane, or the lens of the camera in a direction directly opposite to that direction.

The required velocity of this image motion compensating motion is a function of the ground speed and altitude above the ground of the airplane, of the angles of obliquity of the camera lens axis with reference to the vertical, and with reference to the direction of flight of the airplane, and of the focal length of the camera lens. From this, is can be seen that the velocity of the required image motion compensating motion can vary over an extremely wide range.

It is, therefore, the primary object of the invention to improve the definition of aerial photographs by providing mechanism which is capable of imparting image motion compensating motion over a wide range of velocities.

Another object of the invention is to provide such mechanism wherein the velocity is continuously adjustable over a range that extends from zero up to a chosen maximum velocity.

Another object of the invention is to provide such mechanism wherein a given setting of the adjusting member always produce the same velocity within a negligibly small error.

The image motion compensating devices of the prior art have either failed to accomplish the above objects or have accomplished them by relatively complicated arrangements involving special electric motors for providing the image motion compensating motion, together with means for controlling the speed of rotation of these motors, such control means usually involving electron tubes and associated electrical parts which occupy a substantial amount of space and which generally must be housed in units separate from the camera.

Experience in the use of these devices of the prior art has shown that they, like other electronic equipment, are subject to failure due to the fragility of the electron tubes, failures of insulation, and breakage of fine wires in component parts, especially when such equipment is subjected to the vibration that occurs during the operation of aircraft, and that once the electronic part of a system has broken down, relatively expert and specialized personnel are required to repair it and restore it to service. By contrast, a purely mechanical system can be made highly reliable. It is compact enough to be made an integral part of the camera. Even if breakdown occurs, it is much easier for personnel of average experience to repair mechanical devices because the cause of failure can, in most cases, be seen directly as soon as the mechanism is opened for inspection.

Therefore, it is an object of the invention to provide fully controllable image motion compensation with mechanism which is markedly simpler, smaller, lighter, and more reliable than the devices of the prior art.

It is a further object of the invention to provide fully controllable image motion compensation by purely mechanical means, and it is a still further object of the invention to provide a fully controllable mechanism for image motion compensation which derives its motive power from the same motor which operates the film advance, shutter, and other functions of the camera.

In many cases arising in practice, it is desirable that one and the same camera should be usable for taking views of objects situated on either the right hand or the left hand side of the line of flight. Since, in going from one of these positions to the other, the camera must be turned through an angle approaching 180 degrees, this means that, as referred to the camera itself, the direction of image motion compensation movement must be reversed. In other words, the camera must be capable of providing image motion compensation over the same range of velocities, but in the opposite sense, so that the proper direction of image motion compensating movement of either the light sensitive material or the lens with reference to the direction of flight of the airplane can be maintained no matter whether the camera is directed to the left or to the right of the line of flight.

Accordingly, it is still another object of the invention to provide reversible image motion compensating mechanism.

Since both still and moving picture cameras are employed in aerial photography, it is a further object of the invention to provide image motion compensating mechanism which is suitable for imparting compensating movement to either the lens or to the light-sensitive material in both types of cameras.

Another object of the invention is to provide image motion compensating mechanism which lends itself to the taking of pictures in rapid succession.

In modern aerial photography, and especially wherever it is important to obtain pictures showing fine details of the object, it has been found necessary to suspend the camera in the airplane in such a manner as to isolate it as well as possible from the vibration of the engine and other parts of the airplane. In this case it becomes particularly important to avoid vibration in the camera itself arising from the operation of its own mechanism.

Therefore, another object of the invention is to provide image motion compensating mechanism such that its action is smooth and practically vibrationless, so that it can function without imparting vibratory motion to the camera as a whole.

Still other objects and advantages of the invention include those which are hereinafter stated or apparent, and which are incidental to the invention.

The objects of the invention are substantially attained by providing in a camera, which may be either a still photographic camera or a motion picture camera, an image motion compensating mechanism which includes a member mounted for reciprocating movement and means for reciprocating this member in timed relation to the exposure periods when light is admitted to the interior of the camera by the shutter. The reciprocating member may be either one of the constituent parts of the camera such as the plate which supports the lens or the gate which supports the film (or other light-sensitive material) in the focal plane, or it may be operatively connected to the lens support plate or to the film, as in the case of a gear mounted for reciprocating rotary movement and connected by a uni-directional coupling device to the roller which advances the film.

The reciprocating means are mechanically adjustable. While a number of arrangements are available to suit this purpose, the employment of a reciprocating movement which includes a variable ratio lever system has been found preferable for most embodiments of the invention. Levers of variable ratio permit an accurate and dependable adjustment of the movement which they transmit, both as to the velocity of the reciprocation and the direction of the initial stroke. In other words, the means for varying the lever ratio may be as finely graded as desired, and they can be made so that a given setting of them always produces the same lever ratio within a desired degree of accuracy. Consequently, a given setting will produce the intended velocity of image motion compensating motion within the corresponding accuracy. These benefits, moreover, may be obtained over a very wide range of settings.

The variable ratio lever system is operatively connected at one point to the reciprocating member and at another point to a movable cam in such a way that the variable lever ratio applies between these two points. The cam can readily be shaped so as to give any desired character to the motion of the reciprocating member. Preferably, the cam is rotatably mounted and is in continuous engagement with a follower carried by the lever system, so that the movement of the reciprocating member is positively controlled on the return stroke, as well as on the initial stroke.

It is preferable to shape the cam so that the initial stroke of the motion is made up of a period of gradual acceleration, followed by a relatively long period of motion at constant velocity followed, in turn, by a period of gradual deceleration to a momentary state of rest. From this state of rest the return stroke may well have the character of one-half of a cycle of simple harmonic motion; in other words, the return stroke preferably follows a sinusoidal law. When the cam is designed in this manner, it is possible to employ relatively long periods of exposure, as occur, for example, during the traverse of the curtain of a focal plane shutter, without departure from the correct image motion compensating velocity during this exposure, and at the same time smooth and quiet operation of the compensating mechanism is ensured, and undesirable vibration of the camera or damage to its parts by shock are avoided.

In cases when the exposure period given by the camera shutter is limited, and when inexpensive mechanism is desired, as for example in cameras designed to be expandable, good results can be obtained by using, as the source of the reciprocatory motion, a simple eccentric of variable eccentricity. A simple eccentric, as is well known, imparts simple harmonic motion. Twice during each cycle of such motion, midway between the times and positions of rest, there occurs a period during which the velocity of motion is nearly constant for a time of the order of one-twentieth of the time of the complete cycle. During one of these periods the motion is in the desired direction, during the other it is, of course, in the opposite direction. The approximation to constant velocity is sufficiently good, and the duration of such approximation is sufficient to make the eccentric a satisfactory image motion compensating device for use with between the lens or behind the lens shutters. In this embodiment of the invention the adjustment of the eccentricity of the eccentric takes the place of the adjustment of the ratio of the lever. Since the motion imparted by the eccentric is inherently simple harmonic, or sinusoidal, it is inherently smooth and quiet and has little tendency to impart undesirable vibration to the camera.

To increase the smooth and quiet functioning of the compensating mechanism still further, it has, in some cases, been found desirable to provide a compensating member which has the same mass as the reciprocating member. Like the latter, the compensating member is reciprocated by the reciprocating means, the arrangement being such that the two members are moved simultaneously, but in opposite directions.

In order, finally, to effect the image motion compensating movement at the proper time, that is, when the length of film to be exposed is in the film gate and during the exposure period of the shutter, the movement of the lever operating cam or eccentric is preferably derived from the same source of power which actuates the film feeding and the shutter release mechanisms.

The invention will be better understood when the following description is considered, with the accompanying drawing:

*Description of figures*

In the drawings:

In Figs. 1, 2, 3, 4, 5, and 6 there is shown, by way of example, one embodiment of the invention by means of which image motion compensation is produced in a motion picture camera by movement of the lens 10 of the camera during the exposure period.

Figures 1, 2:
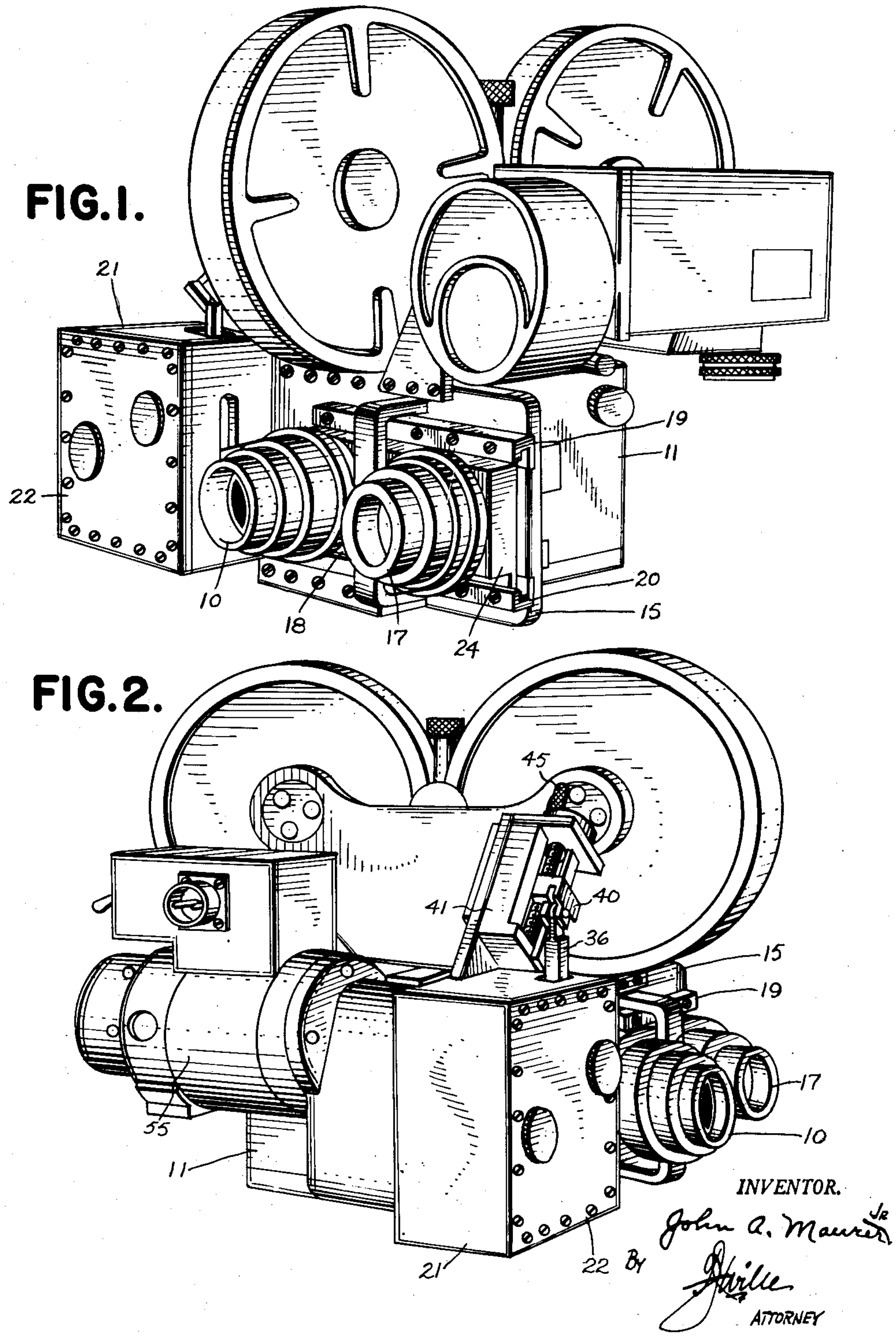
Fig. 1 is a perspective view of a motion picture camera provided with means for producing image motion compensation by movement of the camera lens.
Fig. 2 is a perspective view of the same camera showing the mounting of the drive motor and the image motion compensation control mechanism.

The housing 11 of this camera contains film feeding sprockets, a film gate, and an intermittent movement. These parts are not shown because they are not part of the invention, except that in Fig. 4 the positions of the aperture plate 12, and the back pressure plate 12*a* (or film platen) of the film gate, together with the pull down claw 13 of the intermittent movement are shown in relation to the lens 10 and the shutter 14 of the camera.

The front plate 15 of the camera, which is attached to the housing 11 by screws, as shown, is elongated horizontally so that it extends to the right and left of the housing 11. This front plate is the supporting foundation for lens 10, counterweight 17, and for the image motion compensating mechanism.

Figure 3:
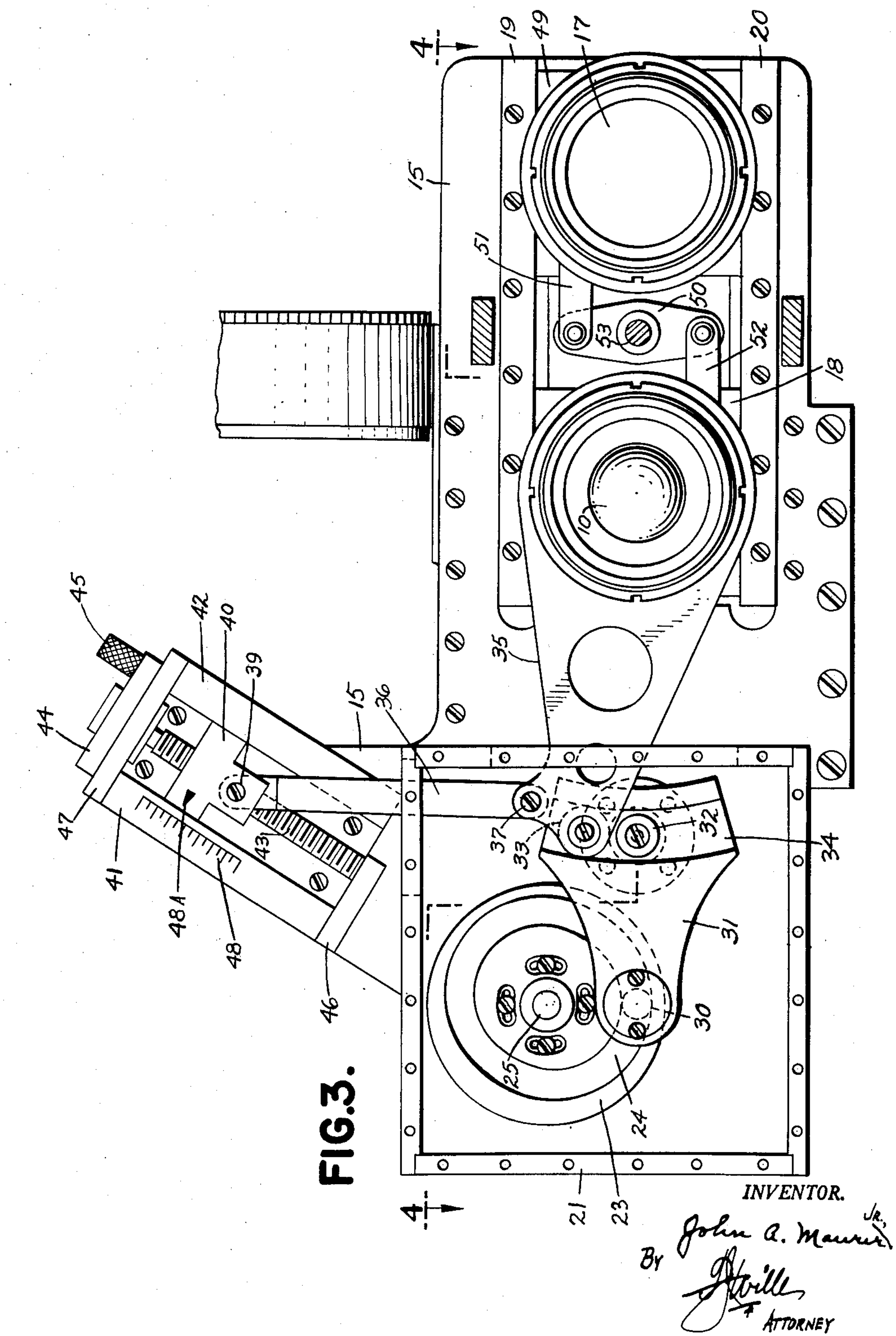
Fig. 3 is a front elevation of the same camera with the cover plate of the image motion compensation control mechanism housing removed, showing the components of the variable ratio lever, and the drive system which produces the reciprocating motion of the lens.
Figure 4:
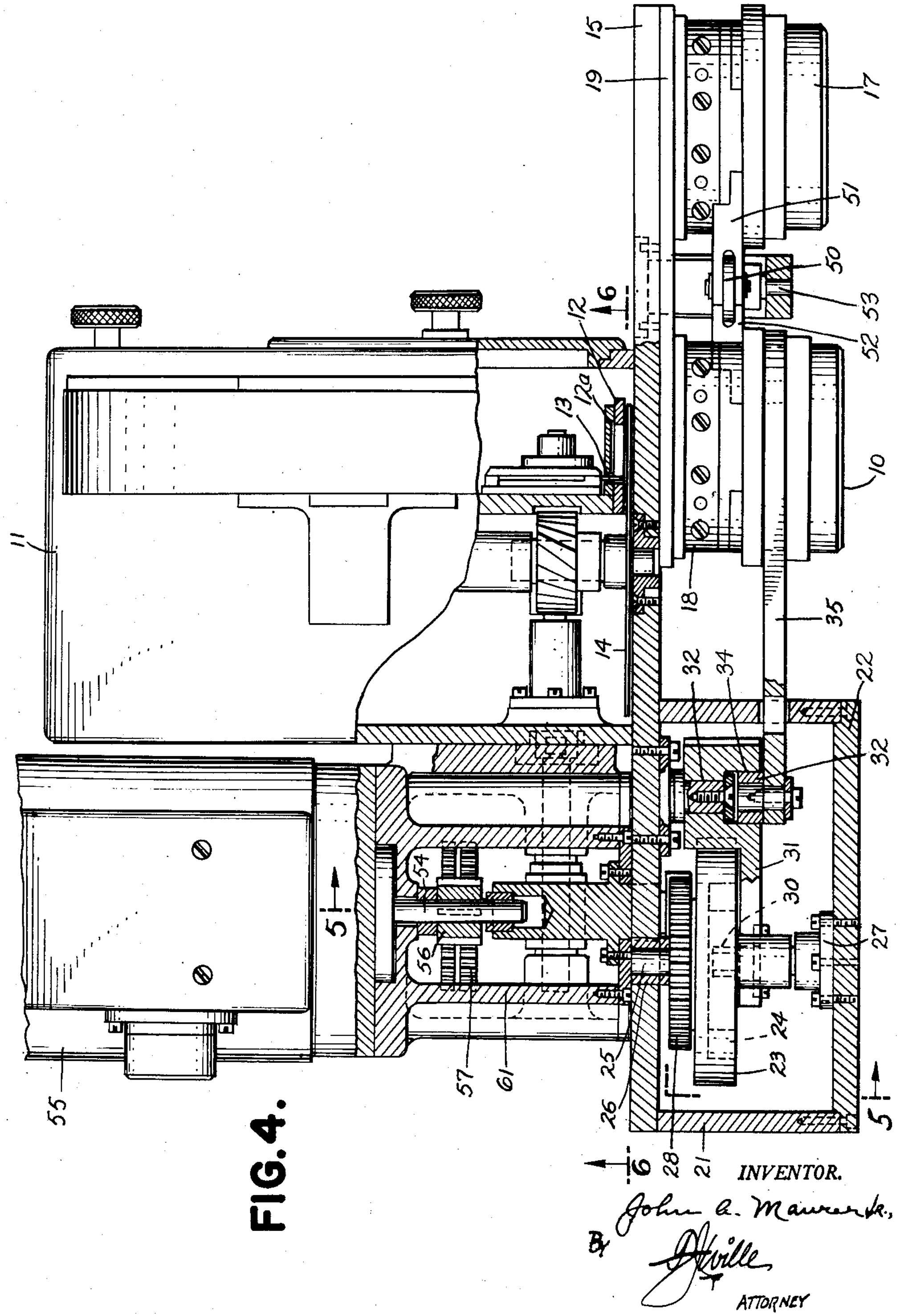
Fig. 4 is a plan view of the same camera with a partial section taken along the line 4—4 of Fig. 3.
Figure 5:
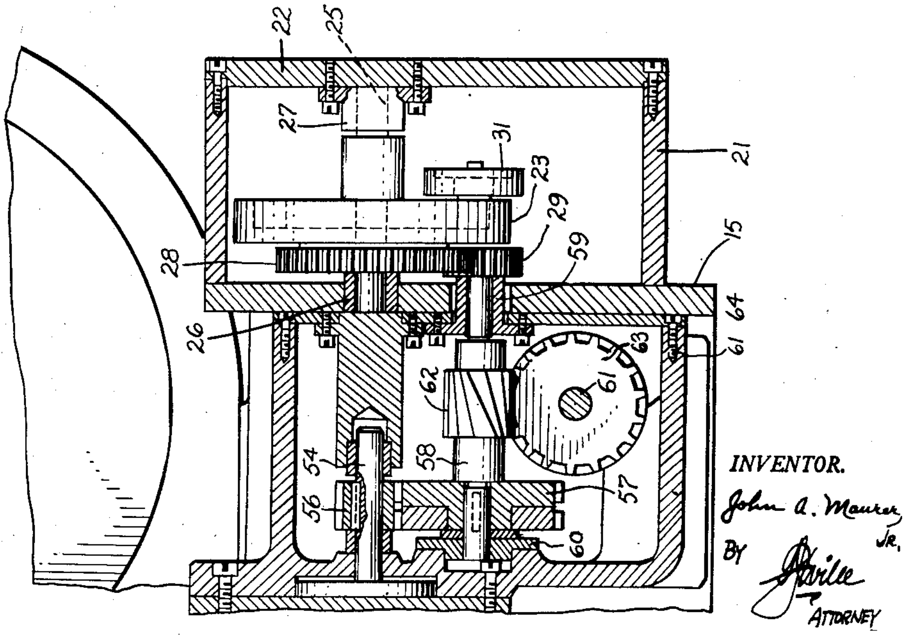
Fig. 5 is a side elevation of the same camera with a vertical section taken along the line 5—5 of Fig. 4.
Figure 7:
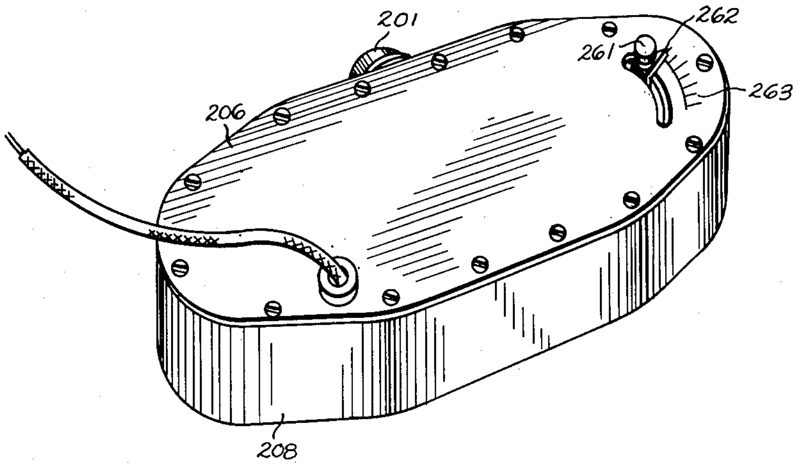
Fig. 7 is a perspective view of a still camera of simple design and inexpensive construction which makes use of a variable ratio lever and reciprocating means to advance the film to compensate for image motion during the exposure.

Lens 10 is mounted in a carriage 18, which is slideably supported in a guide formed by guide rails 19 and 20, which are secured to plate 15 by screws. At the left hand side (Figs. 1 and 3) of plate 15 is a housing 21 which projects forward from the plate. Fig. 3 shows this housing with the cover plate 22 removed. Referring to Figs. 3, 4, and 5, a cam 23 having a cam channel 24 recessed into it is mounted for rotation on shaft 25. Shaft 25 has bearings at 26, mounted in plate 15, and at 27, mounted in cover plate 22. Shaft 25 also carries a gear 28 which is rigidly attached to it. Gear 28 and, therefore, shaft 25 and cam 23 are driven by gear 29, which is part of the motor drive system of the camera. The gear ratio is so chosen that shaft 25 and cam 23 make one rotation for each cycle of the shutter and film drive system of the camera.

A cam follower 30 is in continuous engagement with cam channel 24 and is attached to lever 31 near its end.

Lever 31 is a variable ratio lever with its fulcrum at bearing 32 which is mounted on the front plate 15 of the camera. An arcuate channel 34 is cut in lever 31 with its center line passing through the axis of bearing 32. A follower 33 which fits channel 34 is attached near one end of a link 35. The other end of this link is enlarged to form a large bearing which is fitted around the barrel of lens 10. The radius of curvature of channel 34 is equal to the distance from the axis of bearing 32 to the axis of lens 10 when lens 10 is centered with respect to the picture area on the film. The distance between the center of follower 33 and the axis of the lens 10 is equal to the distance between the axis of bearing 32 and a perpendicular line through the center of the picture area of the film.

When cam follower 30 is in the mid position of the range of travel imposed on it by cam channel 24, the center of curvature of channel 34 is at the axis of lens 10. When cam follower 30 is in this mid position it will be readily seen that the axis of the lens 10 coincides with the center of the picture area of the film and that link 35 may be moved up or down so that follower 33 travels from one end of channel 34 to the other without imparting any displacement to the lens 10.

If, however, cam 23 is rotated, a rocking motion is imparted to lever 31 through channel 24 and cam follower 30. When follower 33 is in the neutral position, with its center on the axis of bearing 32, no movement will be imparted to link 35 by the rocking motion of lever 31. When follower 33 is in any other position in channel 34 a reciprocating motion imparted to link 35 and lens 10 will be dependent only upon the rate of rotation of cam 23. Furthermore, it will be noticed that the direction of the motion imparted to lens 10 by any movement of cam follower 30 may be reversed, by moving follower 33 across bearing 32 to any position on the opposite side of channel 34. In other words, moving cam follower 33 in an upward direction will move lens 10 to the right when follower 33 is in the upper half of channel 34, but the same upward movement of cam follower 30 will move lens 10 to the left when follower 33 is in the lower half of channel 34. This action provides the reversibility feature of the invention, producing image motion compensation for either direction of relative motion between the camera and the object being photographed.

Cam channel 24 is designed in such a way that a uniform velocity in one direction is imparted to lens 10 through lever 31 and link 35 for a time equal to at least one-half of its cycle of reciprocating motion. During the remainder of its cycle the cam channel 24 and linkage system 31, 35, impart a simple harmonic motion to return the lens 10 in the opposite direction and accelerate it to a uniform velocity, thus insuring smooth and quiet operation.

The exposure period of the camera shutter is synchronized with the period of uniform velocity of the lens 10 during its reciprocating motion, by correct timing of gears 28 and 29 which drive shaft 25 and cam 23 so that the uniform velocity period of greater than one-half cycle coincides with the maximum exposure period of the shutter. Therefore, the uniform velocity of the lens will accurately compensate for an image motion of the same uniform velocity throughout the entire exposure period, thus eliminating blurring of the picture due to relative motion of the camera and the object being photographed.

A link 36 is attached at its lower end to link 35 by a bearing 37. At its upper end it is attached by a bearing 39 to an adjusting block 40 which is mounted to slide between guides 41 and 42. Guides 41 and 42 are securely mounted to the front plate 15 of the camera. The position of block 40 is controlled by the screw 43, which is rotated by disc 44 through handle 45, screw 43 being threaded through block 40 and secured in bearings in end plates 46 and 47. A movement of block 40 from one end of its travel to the opposite end will move follower 33 back from an extreme position in channel 34 through the neutral position to the opposite extreme. As previously mentioned, the velocity of the compensating motion imparted to the lens by the motion of cam follower 30 in channel 24 is proportional to the distance between the center of follower 33 and the axis of bearing 32. Therefore, the position of block 40 which controls this distance through link 36 will determine the velocity of the compensating motion imparted to the lens. In this way the velocity of the compensating motion may be continuously adjusted from one extreme through zero to the extreme in the opposite direction. The maximum compensating velocity available is limited only by the length of the arcuate channel 34 and the eccentricity of channel 24. The position of block 40 may be read on scale 48 which is opposite index line 48a on block 40. This scale may be calibrated directly in velocity of the compensating motion. To provide for fine adjustment of the velocity of the compensating motion of lens 10 a micrometer scale is provided on the crank disc 44 with an index mark on the end plate 47.

A counterweight 17 previously mentioned, and having a mass equal to the combined mass of lens 10 plus link 35, plus one-half the mass of link 36, constitutes the compensating member of the image motion compensating system. This counterweight 17 is mounted in a carriage 49 which is slideably supported in the guide formed by guide rails 19 and 20 and is connected to a lever 50 near one end by a link 51. Lever 50 is connected near its opposite end to the lens 10 by link 52 and is supported at its center by a bearing 53 which is mounted on the front plate 15 of the camera. The links 51 and 52 and lever 50 transmit an equal and opposite movement to the compensating member for any movement of the lens 10. Thus the force acting at bearing 32 when the reciprocating motion is imparted to the lens 10 by link 35 is balanced by an equal force acting in the opposite direction at bearing 53. Since both these bearings are rigidly mounted on the front plate 15 of the camera, the camera may be operated at frequencies of 24 frames per second or higher with no substantial vibration being transmitted to the camera.

Figure 6:
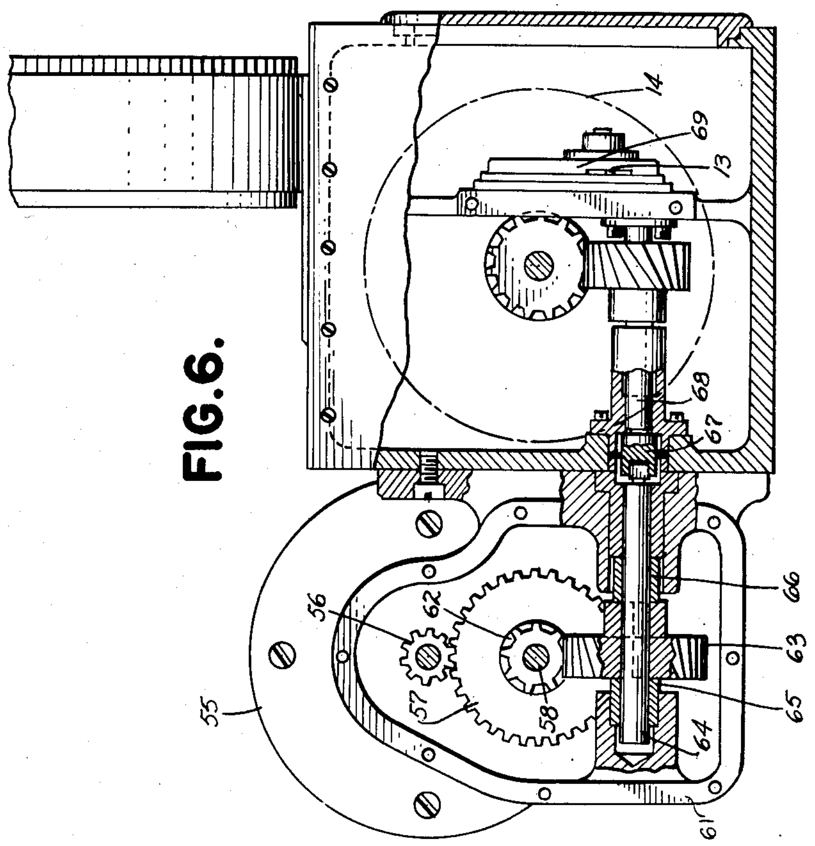
Fig. 6 is a front elevation of the same camera with a partial vertical section taken along the line 6—6 of Fig. 4.

The image motion compensating mechanism is driven by the same motor which drives the camera shutter 14, the previously mentioned film feeding sprockets, and the intermittant movement, thereby providing positive synchronization of the image motion compensating movement of the lens with the exposure period of the shutter. In Figs. 4, 5, and 6 the armature shaft 54 of the drive motor 55 carries a gear 56 which engages with a gear 57 mounted on a shaft 58. Shaft 58 is rotatably mounted in bearings 59 and 60 at the front and back of the gear box 61 and extends through the front of gear box 61 and the front plate 15 of the camera into the image motion compensating mechanism housing 21. At this point gear 29 previously mentioned is mounted on shaft 58. As previously described, gear 29 engages with gear 28 and thereby drives the image motion compensating mechanism.

A helical gear 62 is mounted on shaft 58 at a point inside the gear box 61. Gear 62 engages another helical gear 63 which is mounted on the camera drive shaft 64. Camera drive shaft 64 is rotatably mounted to the sides of the gear box 61 in bearings 65 and 66 and extends through the side of the gear box to a point 67 where it engages endwise with a shaft 68 in the camera which drives the camera shutter 14, the previously mentioned film feeding sprockets and the intermittent movement 69. Therefore, once the timing of the gears has been properly set, the uniform velocity period of the reciprocating motion cycle will always coincide with the exposure period of the camera shutter cycle, no matter what frequency of operation or velocity of compensating motion is used.

The camera just described is an example of the use of a variable ratio lever and reciprocating means to produce a relative motion between the camera lens and the film during exposures made at motion picture frequencies, said relative motion being of uniform velocity during the exposure, and capable of continuous adjustment from zero to maximum velocity in either direction.

Another embodiment of the invention is shown in Figs. 8, 9, 10, 11, 12, 13, 14, and 15. This embodiment is an example of the use of a variable ratio lever and reciprocating means to impart image motion compensating movement to the film platen of a camera in timed relation to the exposure period of the shutter, and at a uniform velocity throughout the duration of the exposure period.

Figure 8:
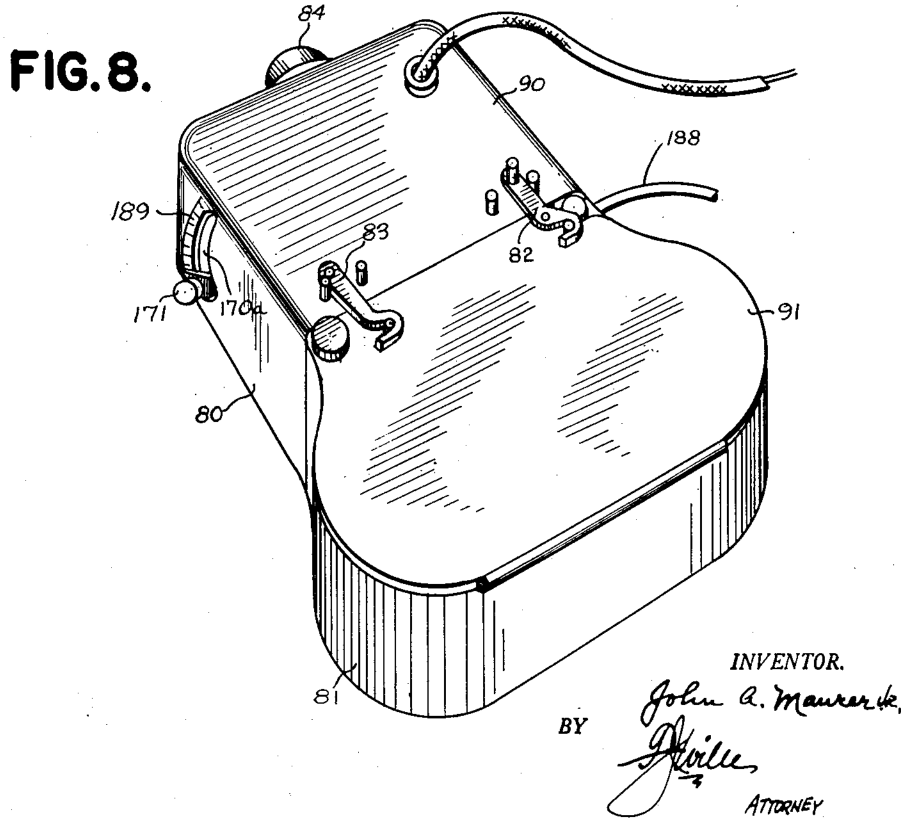
Fig. 8 is a perspective view of a still camera with a detachable film magazine which makes use of a variable ratio lever and reciprocating means to impart an image motion compensating movement to the film platen during the exposure.
Figure 9:
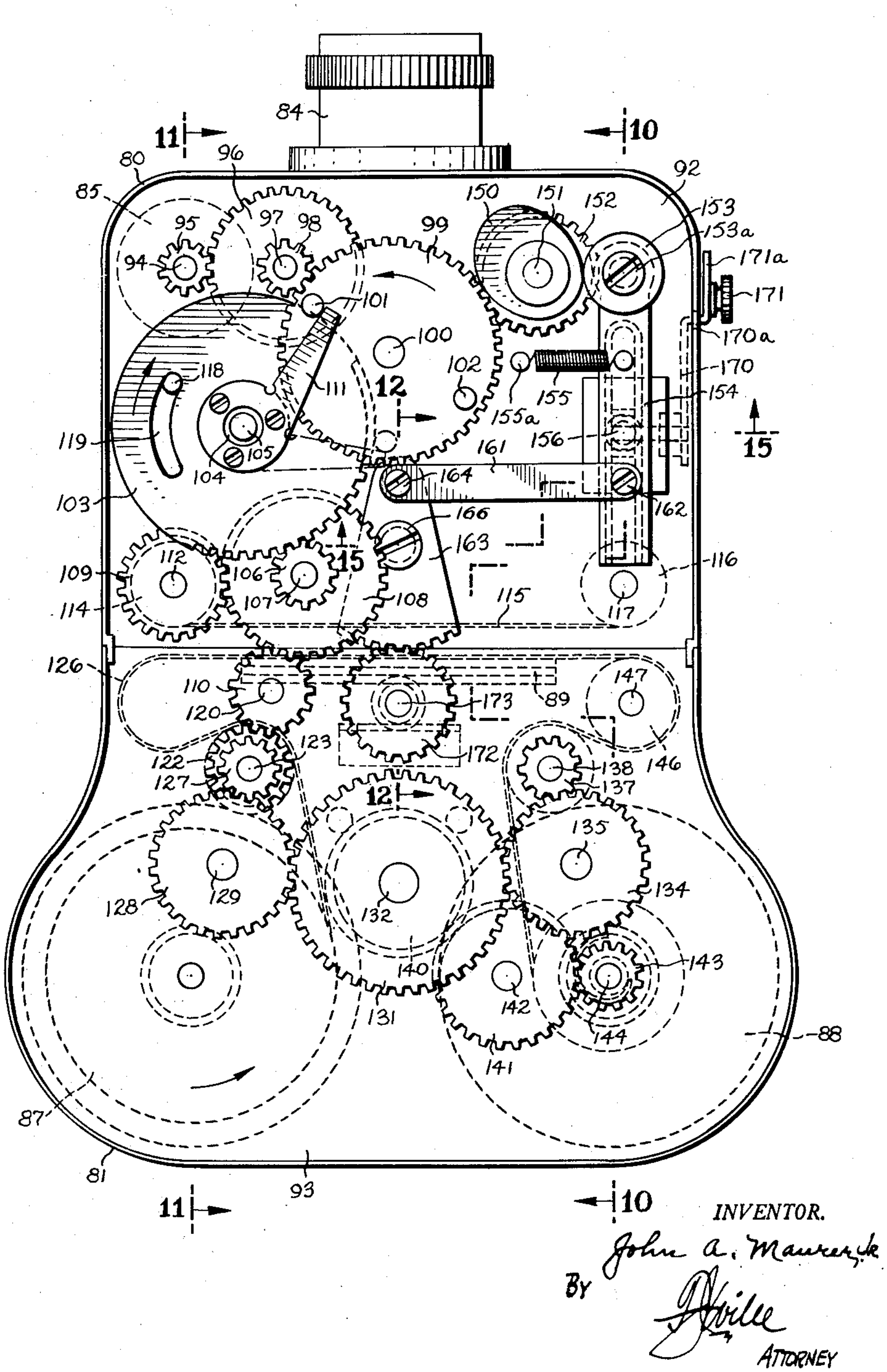
Fig. 9 is a plan view of the camera shown in Fig. 8 with the cover plate removed, showing the shutter drive, film drive, and image motion compensation operating mechanism.
Figure 11:
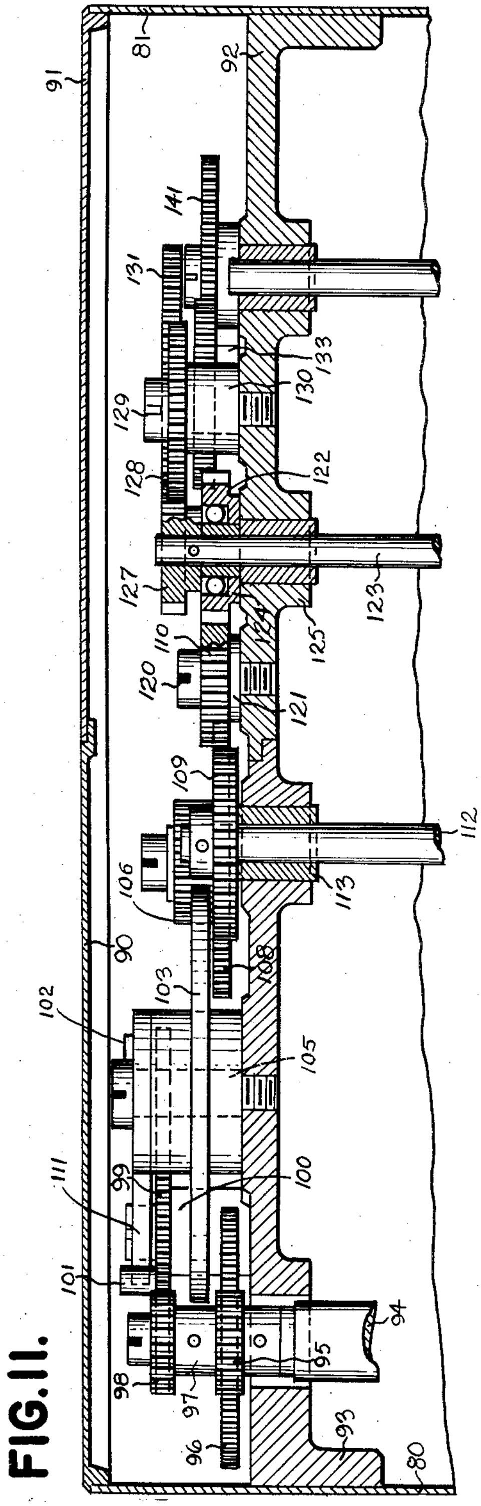
Fig. 11 is a partial vertical section taken along the line 11—11 in Fig. 9, showing the means for producing reciprocating motion and transmitting it to the shutter and film drive mechanisms.

Referring first to Figs. 8, 9, and 11, the camera shown consists of a camera body 80 and a detachable film magazine 81, which is secured to the camera body by hooks 82 and 83. The camera body 80 contains a lens 84, a drive motor 85, a focal plane shutter 115, and the image motion compensating mechanism. The film magazine 81 contains a film supply spool 87, a film take-up spool 88, a movable film platen 89, and means for advancing the film between exposures.

In Figs. 9 and 11 the camera drive mechanism is shown. Fig. 9 shows the mechanism side of the camera with the camera body cover 90 and the film magazine cover 91 removed. The drive mechanism in the camera body is mounted on a support plate 92 which is rigidly attached to the sides of the camera body. The film drive mechanism in the magazine is mounted on a support plate 93 which is rigidly attached to the sides of the magazine. Support plate 93 in the film magazine forms a lap joint with support plate 92 in the camera body when the magazine is attached to the camera body.

The camera drive motor 85 is mounted in the camera body below the support plate 92. The motor shaft 94 extends through the support plate 92 and has a gear 95 mounted on it at its end. This gear 95 engages gear 96, which is rigidly mounted on a shaft 97. A shaft 97 is supported for rotation in a bearing in plate 92, and at its upper end it carries a pinion 98. Pinion 98 engages a gear 99 which is securely attached to a shaft 100. Shaft 100 is likewise supported for rotation in a bearing in plate 92. Gear 99 carries two driving pins 101 and 102 mounted near the periphery of the gear diametrically opposite each other with their axes parallel to the axis of rotation of gear 99.

A gear blank 103, with teeth cut in only a portion of its circumference is mounted for rotation on a bearing 104 at the end of a shaft 105 which is rigidly mounted on the mechanism support plate 92. The teeth cut in the partial gear 103 engage a pinion 106, secured to a shaft 107 which is mounted for rotation in a bearing in the support plate 92. A gear 108 is also secured to shaft 107. Gear 108 meshes with the shutter wind gear 109 and with the film advance gear 110 in the film magazine when the magazine is attached to the camera.

The partial gear 103 has a radial arm 111 mounted on it by screws, as shown in Fig. 9. This arm extends over gear 99 so that the driving pins 101 and 102 mounted on gear 99 are able to engage the arm when gear 99 is turned in a counterclockwise direction.

The shutter wind gear 109 is mounted on a shaft 112 which extends through the mechanism support plate 92 to the bottom of the camera body and is supported for rotation by a bearing 113 mounted in the support plate and by another bearing (not shown) mounted in the bottom of the camera body. A shutter support spool 114 is mounted rigidly on shaft 112, below the mechanism support plate 92. One end of a self-capping type focal plane shutter curtain 115 is mounted on spool 114 so it may be wound onto the spool as the spool is rotated in a clockwise direction. The other end of the focal plane shutter is mounted on another spool 116 which is rotatably supported on a shaft 117 at the opposite side of the camera body. The shutter is mounted on this spool so that it may be wound onto the spool as the spool rotates in a counterclockwise direction. Shaft 117 is rigidly mounted in the mechanism support plate and in the bottom of the camera body. A helical spring 116A is mounted on shaft 117 inside spool 116, with one end rigidly attached to shaft 117 and the other end attached to the inside of spool 116 so that the spring is wound by winding the focal plane shutter from spool 116 onto spool 114.

When the camera is in operation the drive motor 85 transmits a rotational motion through gears 95, 96, and 98 to gear 99, turning it in a counter-clockwise direction. The driving pins 101 and 102, mounted on gear 99, alternately engage arm 111 and turn it to the position shown in dashed lines in Fig. 9, where it is then released. Since the arm 111 is rigidly mounted on the partial gear 103, the rotary motion of arm 111 is transmitted to the partial gear and by it to gear 106 with which it meshes. This motion is transmitted through shaft 107 and gear 108 to gear 109 which drives the shutter wind spool 114 through shaft 112. A counter-clockwise rotation of gear 99 produces a clockwise rotation of the shutter wind spool 114, so that the focal plane shutter 115 is wound onto that spool and unwound from spool 116. The clockwise motion thus produced in spool 116 winds the helical spring mounted therein. During this motion the focal plane shutter 115 is wound across the exposure area fully capped.

When the radial arm 111 has been turned by the driving pin on gear 99 to its extreme position, indicated by the dashed lines in Fig. 9, the helical spring is fully wound. As the pin continues its motion, the arm 111 is released, and the helical spring **116*a* inside spool 116 can rotate the spool in a counter-clockwise direction, thereby pulling the focal plane shutter 115 across the exposure area uncapped, and producing an exposure on the film. By this action, the shutter wind gear 109 is turned in a counter-clockwise direction, and through gear 108, shaft 107, and pinion 106, the partial gear 103 is likewise turned in a counter-clockwise direction, thus returning the radial arm 111 to its initial position while the shutter is making the exposure. A vertical pin 118 is securely mounted in the support plate 92 and engages a slot 119 cut in the partial gear 103. This slot 119 limits the angular travel of the partial gear 103 so that the radial arm 111 attached to its stops in a position at which the driving pins 101 and 102 are able to engage it and turn it to the wound position as gear 99 rotates. During each exposure cycle gear 108 is thus turned first in a counter-clockwise direction by the action of the radial arm 111, and then in a clockwise direction by the action of the spring mounted inside spool 116**.

Figure 14:
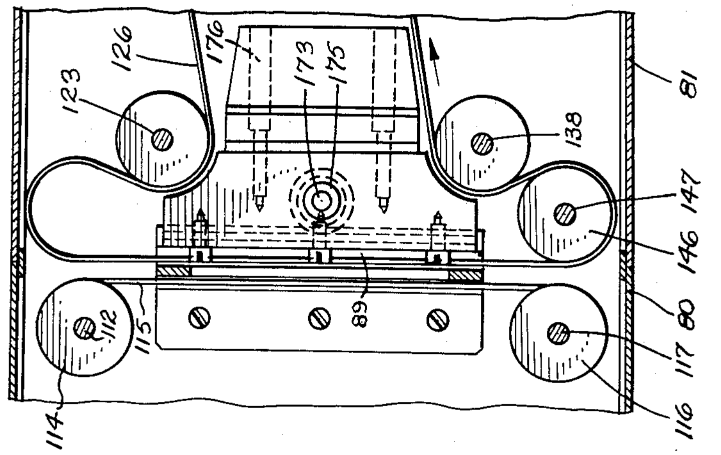
Fig. 14 is a horizontal section taken along the line 14—14 of Fig. 12.

Gear 108 projects through the back surface of the camera body and engages the film advance gear 110 in the film magazine when the magazine is attached to the camera body. The film advance gear 110 is mounted on a shaft 120 which is supported for rotation in a bearing 121 mounted on the magazine mechanism support plate 93. Gear 110 meshes with gear 122 which is supported on a shaft 123 by means of a one-way clutch 124. Shaft 123 extends down through the support plate 93, and is supported for rotation by a bearing 125 mounted in plate 93 and by a bearing (not shown) mounted in the bottom of the film magazine. Film drive sprockets, see Fig. 14, are mounted on this shaft which engage the film 126 and advance it one frame each time gear 122 is turned in a counter-clockwise direction by the action of the driving pins 101 and 102 on the radial arm 111. As the shutter spring action returns the radial arm 111 to its initial position gear 122 is turned in a clockwise direction. However, when gear 122 is turned in this direction, the one-way clutch 124 allows it to slip so that shaft 123 and the film drive sprockets remain stationary during the exposure part of the shutter cycle. Thus, no clockwise motion is transmitted to the shaft 123, and the sprockets mounted on it advance the film 126 in a counter-clockwise direction only, one frame at a time, while the shutter is being rewound onto spool 114 between exposures.

Shaft 123 has a gear 127 securely mounted on it at its upper end. Gear 127 meshes with a gear 128 which is attached to a shaft 129. Shaft 129 is supported for rotation in a bearing 130 which is mounted on the support plate 93. Gear 128 engages a gear 131 which is mounted on a shaft 132 supported for rotation by a bearing 133 mounted on the support plate 93. Gear 131 engages another gear 134 mounted on a shaft 135 which is supported for rotation in a bearing 136 mounted on the support plate 93. Gear 134 engages a gear 137 which is mounted on a shaft 138. Shaft 138 extends down through support plate 93 and is supported by a uni-directional clutch 139 (see Fig. 10) mounted in the support plate and by a bearing mounted in the bottom of the film magazine, see Fig. 14. Film drive sprockets mounted on this shaft engage the film 126 and advance it in a counter-clockwise direction each time gear 122 is turned in a counter-clockwise direction by the action of the driving pins 102 and 101 on the radial arm 111. The one-way clutch 139 allows shaft 138 to turn in a counter-clockwise direction only, and thus prevents the train of gears from gear 127 to gear 137 from turning backward when the film platen is moved by the image motion compensating mechanism during the exposure.

Since gear 137 has the same number of teeth as gear 127, and gear 134 has the same number of teeth as gear 128, and the sprockets on shaft 138 are identical with those on shaft 123, the film is advanced the same distance by each set of sprockets when gear 122 turns shaft 123.

Shaft 132 has another gear 140 attached to it below gear 131. Gear 140 engages a gear 141 mounted on a shaft 142 which is supported for rotation in a bearing (not shown) mounted on the support plate 93. Gear 141 engages a gear 143 which is mounted on a shaft 144. Shaft 144 extends down through the support plate 93 and is supported for rotation by a bearing 145 mounted in the support plate 93. A film spool spindle (not shown) is mounted for rotation on shaft 144 below plate 93 and is connected to shaft 144 by a friction clutch. This spindle engages the film take-up spool 88 and turns it in a counter-clockwise direction each time gear 122 is turned in a counter-clockwise direction by the action of the driving pins 101 and 102 on the radial arm 111. The ratio of the gears driving shaft 144 to the gears driving the film advance sprockets on shaft 138 is so arranged that the motion imparted to shaft 144 is more than sufficient to wind onto spool 88 the amount of film advanced by the sprockets even when the film is at its smallest diameter on the spool. The friction clutch connecting shaft 144 to the film spool spindle allows the shaft to slip in the spindle when the film advanced by the sprockets on shaft 138 has been taken up and the film is wound tightly on the spool.

After the film passes over the film platen 89 and before it reaches the sprockets on shaft 138, the film passes around an idler roller 146, as shown in Fig. 14. This idler roller is mounted on a shaft 147 which extends from the support plate 93 down to the bottom of the magazine. This shaft is supported for rotation in moveable bearings (not shown) which are mounted in slots in the support plate and in the bottom of the magazine. These slots allow idler roller 146 and shaft 147 to be moved toward or away from the film platen 89, but the bearings supporting shaft 147 are pressed by springs in a direction away from the film platen. The pressure exerted by these springs is great enough to overcome the pull of the film during the film advance portion of the exposure cycle, so that the spool is held in the position away from the film platen while the film is being advanced. In this way the length of film between the film platen and the film advance sprockets is the same at all times, thus assuring a uniform spacing between frames on the film.

Figures 12, 13:
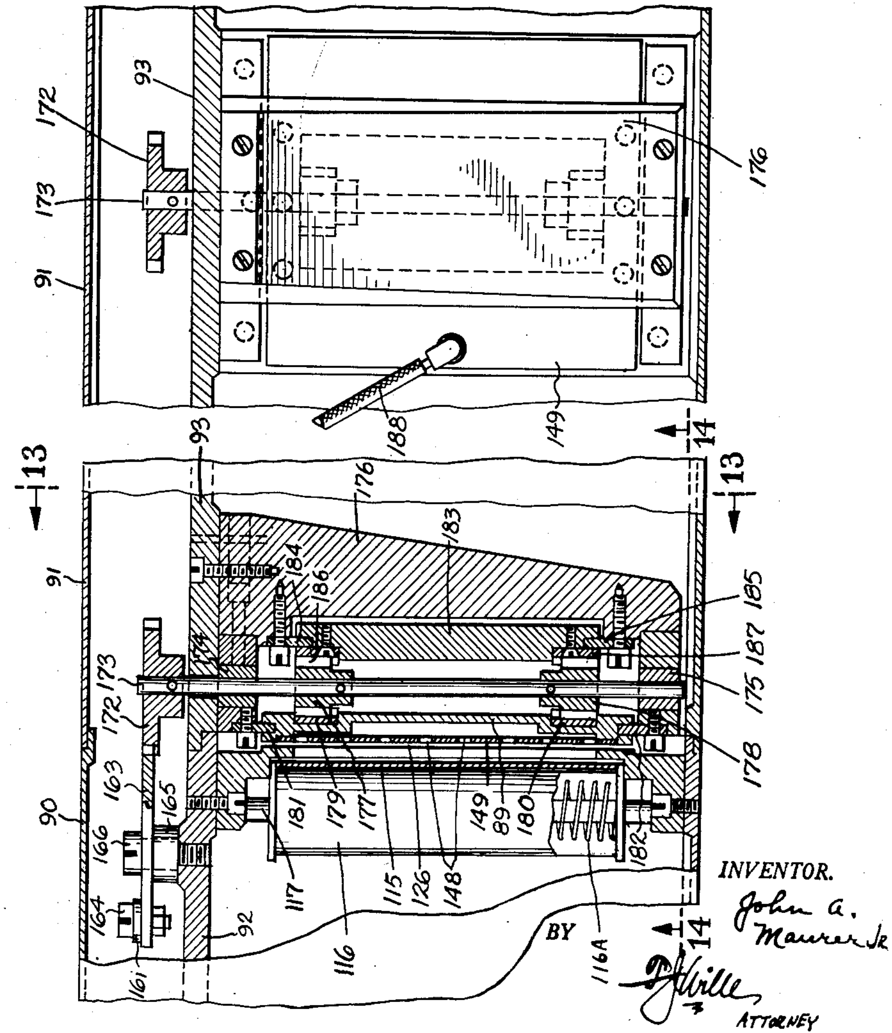
Fig. 12 is a partial vertical section taken along the line 12—12 of Fig. 9 showing the mounting of the film platen in the magazine.
Fig. 13 is a partial vertical section taken along the line 13—13 of Fig. 12.

During the exposure portion of the shutter cycle the film 126 is held securely against the film platen 89 by a vacuum which is applied through small perforations 148 in the pressure plate 149 of the film platen, as shown in Fig. 12. Shaft 138 is prevented from turning in a clockwise direction by the uni-directional clutch 139 and the film is prevented from slipping in the film platen by the vacuum applied. Therefore, any motion of the film platen to the left during the exposure imposed on it by the image motion compensating mechanism will pull the film idler roller 146 to the left (see Fig. 9), overcoming the pressure of the springs tending to hold it to the right side of the camera. When the exposure is completed the vacuum is released and the idler roller returns to its original position. The film is then advanced by the sprockets and the film platen is returned to its original position by the image motion compensating mechanism. When the vacuum is applied again the length of film between the film platen and the sprockets is the same as it was during the previous exposure, so that the spacing of the frames on the film is uniform.

In this embodiment of the invention the image motion compensating movement is imparted to the film platen of the camera in timed relation to the exposure period of the shutter by means of a driving cam and a variable ratio lever.

The driving cam 150 is attached to a shaft 151 which is mounted for rotation in a bearing secured in the camera mechanism support plate 92. A gear 152 is likewise securely attached to shaft 151. Gear 152 engages gear 99 and has half as many teeth as gear 99, so that it makes one rotation for each cycle of the shutter. A cam follower 153 is mounted at one end of the variable ratio lever 154 by a screw 153*a*. A spring 155 is attached at one end to the variable ratio lever and at its other end to a pin 155*a* mounted in the support plate 92. This spring holds the variable ratio lever 154 to the left, thereby forcing the cam follower to stay in contact with the cam.

Figure 10:
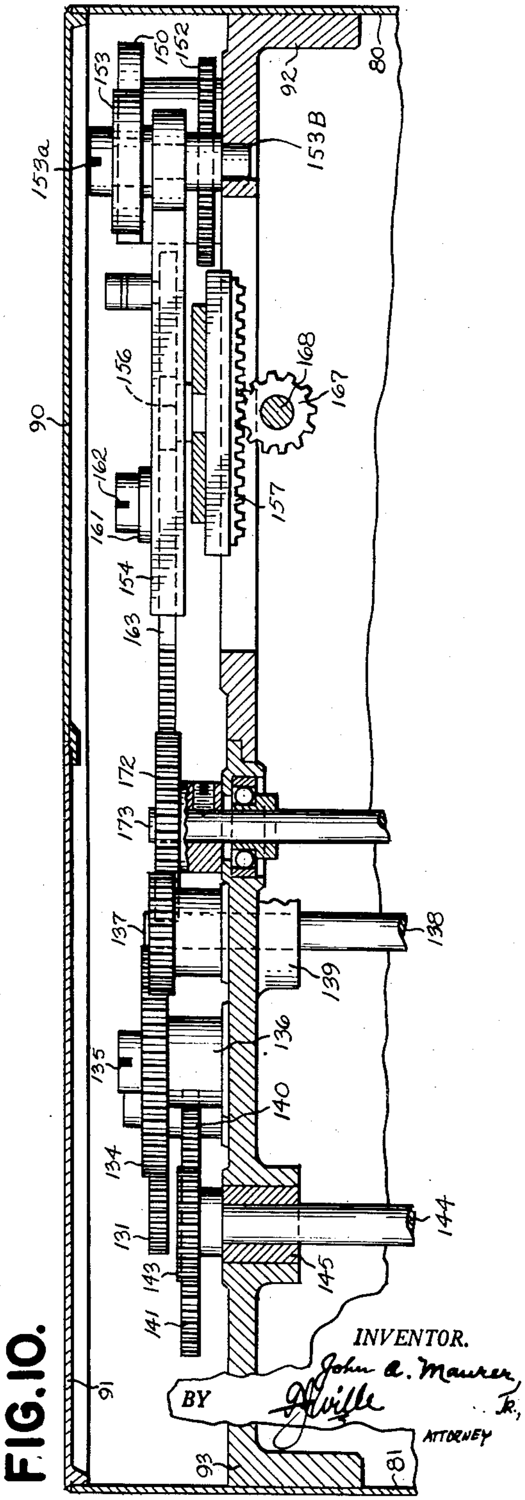
Fig. 10 is a partial vertical section taken along the line 10—10 of Fig. 9, showing the mounting of the variable ratio lever, means for adjusting said lever, and means for transmitting reciprocating motion to the film platen in the magazine.
Figure 15:
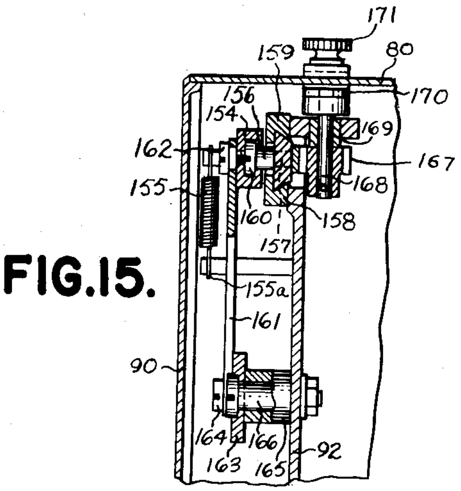
Fig. 15 is a partial vertical section taken along the line 15—15 of Fig. 9 showing the mounting of the variable ratio lever and means for adjusting it.

Referring to Figs. 10 and 15, the variable ratio lever 154 is supported by a pin 156. This pin acts as a fulcrum for the variable ratio lever and has a T head which fits into a T slot 160 cut lengthwise into the bottom of the variable ratio lever. Pin 156 is mounted on the back face of a rack 157. Rack 157 is slideably supported with its teeth extending downward by two guides 158 and 159 which are mounted on plate 92 and which allow rack 157 and pin 156 to move in a direction parallel to the length of the variable ratio lever. Slot 160 is cut into lever 154 from a point beyond the cam follower 153 to the opposite end. A link 161 is attached at one end to the top of lever 154 at a point approximately two-thirds of its length from the end at which cam follower 153 is mounted. Link 161 is attached to lever 154 by a screw 162 which has a shoulder of sufficient height to allow the link to turn freely when the screw is tightened. Link 161 is attached at its opposite end to a gear segment 163 by another screw 164. This screw likewise has a shoulder of sufficient height to allow link 161 to turn freely on it when it is tightened. Link 161 is attached to gear segment 163 at a point near the end opposite the teeth. Gear segment 163 is supported for rotation near its center by a bearing 165 mounted on a bolt 166 which is secured to the support plate 92.

Pin 156, which acts as the fulcrum for the variable ratio lever 154 can be moved to any position in slot 160 in the variable ratio lever by means of a gear 167 which is mounted below plate 92 and engages the teeth of rack 157 through an opening cut in plate 92. Gear 167 is mounted on a shaft 168 which is supported for rotation in a bearing 169 attached to the mechanism support plate 92. One end of an arm 170 is attached to the end of shaft 168 near the side of the camera body. Arm 170 extends parallel to the side of the camera body toward the front end of the camera to a slot 170*a* cut in the side of the camera body. At this point arm 170 is bent at right angles to the side of the camera body, so as to extend outward through slot 170*a*. A knurled knob 171 and a pointer 171*a* are mounted on this end of arm 170 outside the camera body.

When gear 167 is rotated by moving the knurled knob 171, rack 157 is moved endwise and pin 156 is thereby moved lengthwise in slot 160 in the variable ratio lever. The remote unthreaded portion 153B of screw 153*a* extends down through lever 154 and engages a slot cut into plate 92. This slot is perpendicular to the length of lever 154 and prevents it from moving endwise, but allows the follower to move back and forth as cam 150 rotates.

Cam 150 is turned once during each camera cycle by gear 99 and it is cut and positioned so that follower 153 is pushed away from shaft 151 by a section of the cam having a constant increase of radius per unit angle of rotation during the exposure portion of the shutter cycle. The remainder of the cam surface is cut so that the follower will return to its original position by a simple harmonic motion. Lever 154 thus rotates about pin 156 with constant velocity in a clockwise direction during the exposure portion of the shutter cycle. Unless pin 156 is in a position in slot 160 which is directly beneath screw 162, a lengthwise motion of constant linear velocity will be imposed on link 161 during this period. This motion of link 161 will turn gear segment 163 at a constant angular velocity about its pivot point, bolt 166.

The teeth of gear segment 163 extend through the back surface of the camera body and engage a gear 172 in the film magazine when the magazine is attached to the camera body. Gear 172 is attached to a shaft 173 which extends down through the magazine support plate 93 to the bottom of the magazine behind the film platen, as shown in Figs. 12 and 13. Shaft 173 is supported for rotation by bearings 174 and 175 mounted in the film platen support 176 which is secured to the magazine support plate 93 by screws, as shown in the figures. Two pinions 177 and 178 are mounted on shaft 173 at points near the top and bottom of the film platen 89. Pinions 177 and 178 engage two racks 179 and 180 cut horizontally in the back surface of the film platen. The film platen is slideably supported in grooves cut in its top and bottom by two guides 181 and 182 which are attached to the film platen support by screws. Thus the film platen is moved horizontally, in a direction perpendicular to the axis of the lens 84 by a rotation of gear 172, the velocity of the motion imparted being directly proportional to the angular velocity of gear 172. A counterweight 183, having a mass equal to the mass of the film platen 89 is mounted in back of shaft 173 on the film platen support 176. This counterweight is slideably supported in grooves cut in its top and bottom by two guides 184 and 185 which are mounted on film platen support 176 by screws. These guides allow the counterweight to move in a horizontal direction, parallel to the direction of motion of the film platen. Two racks 186 and 187 are cut horizontally in the front surface of the counterweight near its top and bottom. These racks engage the pinions 179 and 180 mounted on shaft 173. Thus, the counterweight is moved at the same velocity but in a direction opposite to the motion of the film platen when gear 172 is rotated. Since the mass of the counterweight is equal to the mass of the film platen, it acts as a mass compensating member, so that no lateral force of reaction is transmitted to the camera by shaft 173 when the film platen is moved. Therefore, no appreciable vibration occurs when the camera is in operation.

The pressure plate 149 of the film platen is so mounted that a practically air-tight seal between it and the film-platen on which it is mounted is maintained. A flexible vacuum line 188 is attached to a hole cut in the back of the film platen. During the exposure a vacuum is applied through this line which draws the film against the pressure plate by means of several small perforations 148 in the pressure plate. The vacuum thus applied serves to hold the film flat and to prevent any lateral motion of the film on the pressure plate during the exposure, thus assuring that any motion imparted to the film platen during the exposure will also be imparted to the film.

A motion of uniform angular velocity which has been transmitted from driving cam 150 to gear segment 163 by lever 154 and link 161, during the exposure, is imposed on shaft 173 by gear 172. This motion is, in turn, transmitted by pinions 177 and 178 and racks 179 and 180 to the film platen and the film, resulting in a linear horizontal motion of uniform velocity during the shutter exposure. While the film is being advanced between exposures the film platen is returned to its starting position with minimum acceleration by a harmonic motion imposed on it by the action of cam 150 and spring 155.

The velocity and direction of the motion thus transmitted to the film during the exposure are determined by the position of pin 156 in slot 160 in the bottom of the variable ratio lever 154. Referring to Figs. 9 and 10, when pin 156 is directly beneath screw 162, the axis of the rotational motion produced in lever 154 coincides with the point of application of force to link 161, so that no motion is transmitted by link 161 and the film platen remains stationary during the exposure. When pin 156 is moved to a position in slot 160 between screw 162 and cam follower 153, link 161 will be moved to the left by the action of cam 150 on the follower during the exposure. This action results in a clockwise motion of shaft 173, which in turn moves the film platen to the right through pinions 177 and 178. As previously described, cam 150 is cut so as to transmit a motion of uniform velocity to the film platen during the exposure. The magnitude of this velocity is directly proportional to the ratio of the distance from pin 156 to screw 162 to the distance from pin 156 to the center of cam follower 153. When pin 156 is moved to a position between screw 162 and the end of the variable ratio lever opposite the end at which the cam follower is mounted, link 161 will be moved to the right by the action of cam 150 on the follower during the exposure. This results in a motion of the film platen to the left during the exposure. The velocity of this motion will also be proportional to the ratio of the distance from pin 156 to screw 162 to the distance from pin 156 to the center of cam follower 153. The velocity of the image motion compensating movement imparted to the film platen during the exposure by the cam and variable ratio lever may thus be continuously varied from a maximum in one direction down through zero and up to a maximum in the opposite direction by varying the position of pin 156 in slot 160.

The position of pin 156 in slot 160 may be adjusted to any desired position by moving knob 171 along scale 189 (Fig. 8) marked on the outside of the camera body next to slot 170*a*. Scale 189 may be calibrated directly in velocity and direction of the image motion compensating movement imparted to the film during the exposure portion of the shutter cycle.

A further embodiment of the invention is shown by way of example in Figs. 7, 16, 17, 18. This embodiment consists of a camera of simple design and inexpensive construction in which an image motion compensating movement is imparted to the film by advancing it across the exposure area at the same rate and in the same direction as the image movement during the exposure.

This camera contains a lens 201, a shutter 202, a film supply spool 203, a film take-up spool 204, a drive motor 205, and mechanism for operating the shutter, advancing the film, and imparting the image motion compensating movement to the film in a timed sequence of operations during each exposure cycle.

Figure 16:
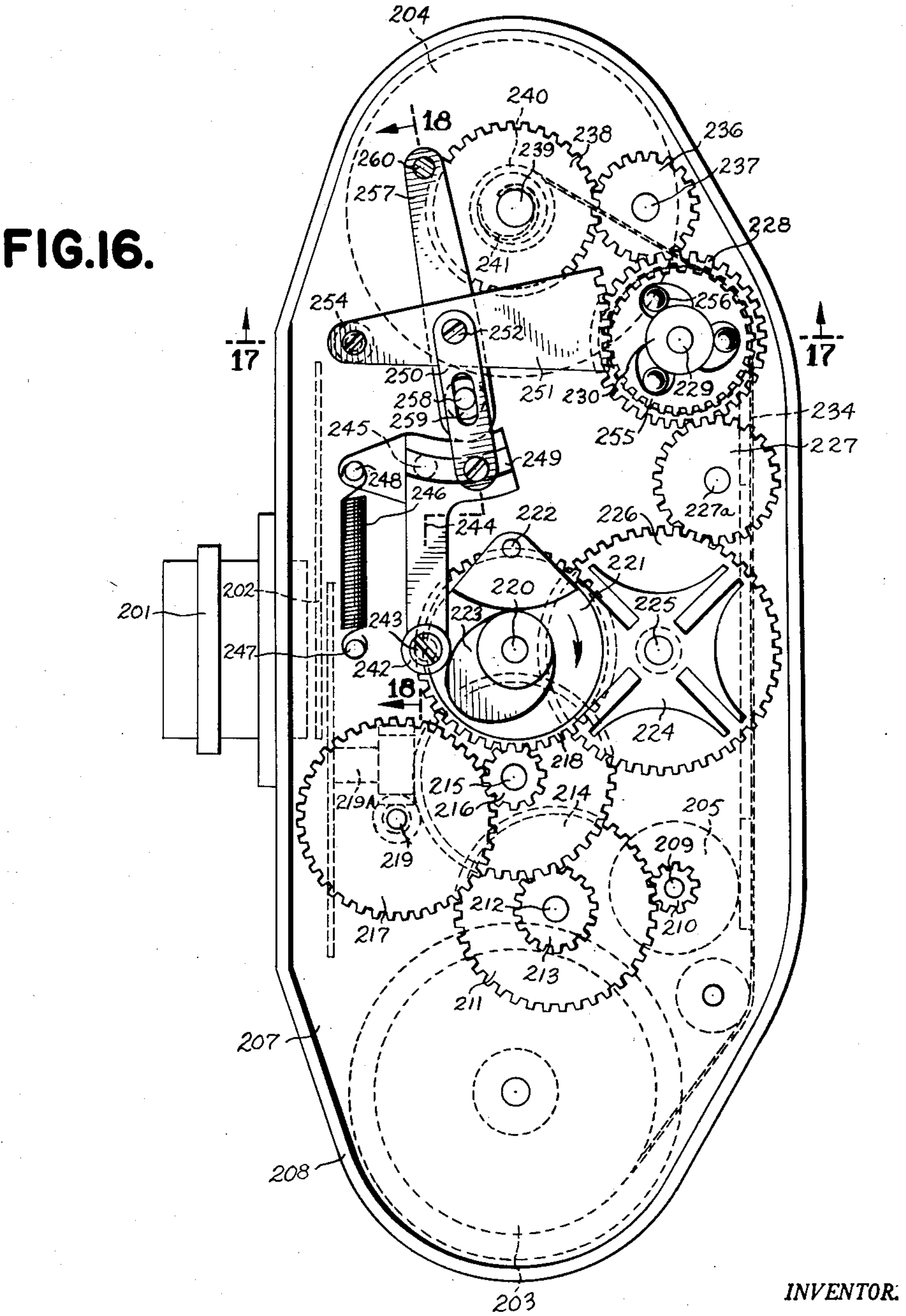
Fig. 16 is a plan view of the camera shown in Fig. 7 with the cover plate removed, showing the arrangement of the components and operating mechanism.

Fig. 16 is a plan view of the camera with the cover plate 206 removed. The camera operating mechanism is supported by a plate 207 which is rigidly attached to the sides of the camera housing 208. The drive motor 205 is mounted below this plate with its rotor shaft 209 extending up through an opening in the plate. A pinion 210 is mounted on shaft 209 and engages a gear 211. Gear 211 is secured to a shaft 212 which is rotatably mounted on the mechanism support plate 207. A pinion

213 is also mounted on shaft 212 at a point above gear 211. Pinion 213 meshes with a gear 214 which is mounted on a shaft 215 supported for rotation in the mechanism support plate 207. Shaft 215 has a pinion 216 mounted on it near its end, above gear 214.

Pinion 216 meshes with two gears 217 and 218. Gear 217 is securely attached to a shaft 219 which extends down through the support plate 207 and is supported for rotation by a bearing mounted therein. At its lower end shaft 219 is geared to the shutter shaft 219A so that the shutter makes one exposure for each rotation of gear 217.

Gear 218 is securely mounted on a shaft 220 which is supported for rotation by a bearing mounted on the mechanism support plate 207. A driving wheel 221 of a Geneva-type intermittent mechanism is mounted on shaft 220 at a point above gear 218. A driving pin 222 is mounted in a vertical position on the driving wheel 221 near its periphery. A cam 223 is also mounted on shaft 220 above the driving wheel.

Figure 17:
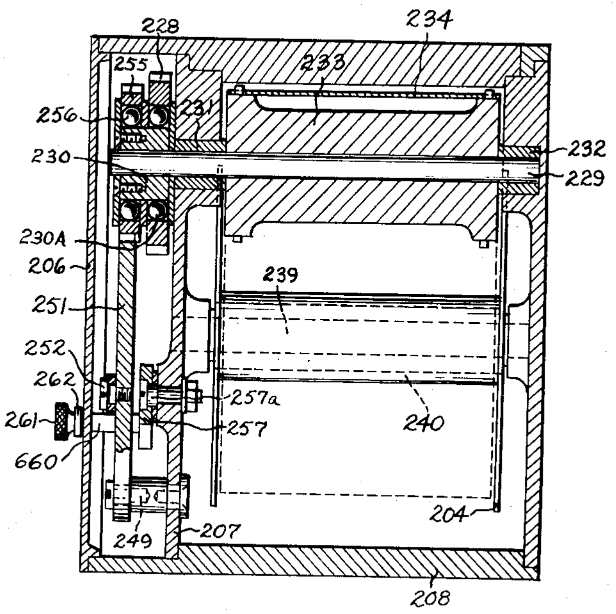
Fig. 17 is a vertical section taken along the line 17—17 of Fig. 16, showing the means for transmitting motion to the film.

A four-pointed star wheel 224 is mounted on a shaft 225 which is rotatably supported in a bearing mounted on the support plate 207. A gear 226 is mounted on shaft 225 below the star wheel. Gear 226 engages an idler gear 227 mounted on a shaft 227*a* which is supported for rotation on the support plate 207. Gear 227 engages a gear 228 which is mounted on a shaft 229 by means of a one-way clutch, which is made up of inner clutch member 230, balls 230*a* and gear 228. Shaft 229 extends down through the support plate to the bottom of the camera and is rotatably supported by bearings 231 and 232 mounted in the support plate and in the bottom of the camera. A sprocket drum 233 is mounted on shaft 229 which engages sprocket holes in the film 234, as shown in Fig. 17.

One-way clutch 230 allows shaft 229 to turn in a counter-clockwise direction, but not in a clockwise direction, when gear 228 is held stationary. Consequently, a counter-clockwise motion of gear 228 will turn shaft 229 in a counter-clockwise direction, but a clockwise motion of gear 228 will not turn the shaft. Gear 228 engages an idler gear 236 mounted on a shaft 237 which is supported for rotation in a bearing mounted on the support plate 207. Gear 236 meshes with a gear 238 mounted on a shaft 239 which extends down through the support plate 207 and is supported for rotation in a bearing mounted therein. A film spool spindle 240 is mounted for rotation on shaft 239 below plate 207 and is connected to shaft 239 by a friction clutch 241. Spindle 240 engages the film take-up spool 204 onto which the film is wound after it has been exposed.

When the camera is in operation the drive motor 205 transmits a rotational motion through gears 210, 211, 213, and 214 to pinion 216, turning it in a counter-clockwise direction. Pinion 216 turns the Geneva driving wheel 221 in a clockwise direction so that the driving pin 222 successively engages each of the slots in the star wheel 224, thereby turning the star wheel and gear 226 intermittently in a counter-clockwise direction. This intermittent motion is transmitted by gears 227 and 228 and clutch 230 to shaft 229 and the sprocket drum mounted on it, thereby advancing the film intermittently across the exposure plane toward the film take-up spool 204. The ratio of gears 226 and 238 and the film drive sprocket drum 240 is such that the film is advanced one frame for each quarter turn of gear 226.

The intermittent counter-clockwise motion of gear 228 is transmitted to the take-up spool 204 by gears 236 and 238 and friction clutch 241. The gearing is arranged so that the rotation of the take-up spool 204 is more than sufficient to wind onto the spool the length of film advanced by the sprocket drum 233 for each quarter turn of gear 226 and any additional length advanced during the exposure by the image motion compensation mechanism. The friction clutch 241 allows shaft 239 to slip inside spindle 240 if the film has been wound tightly on the take-up spool 204.

Pinion 216, in addition to advancing the film intermittently in the manner described above, also drives the shutter 202 through gear 217 and shaft 217*a*. The timing of gears 217 and 219 is so arranged that the exposure period of the shutter cycle occurs at a time when the star wheel 224 is not moving, so that the frame-to-frame advancing of the film takes place at a time when the shutter is closed. Since the shutter makes one exposure for each rotation of gear 217, and gear 218 has the same number of teeth as gear 217, once this relation has been established it will always be maintained.

A cam follower 242 is mounted by means of a screw 243 at one end of a crank-arm type lever 244. Lever 244 is a variable ratio lever with its fulcrum at bearing 245, which is mounted in the support plate 207. A spring 246 is attached at one end to a pin 247 which is mounted vertically on the support plate and at its other end to a pin 248 which is mounted vertically on lever 244. Spring 246 holds the cam follower 242 against cam 223. An arcuate channel 249 is cut into the arm of lever 244 which is perpendicular to the arm on which the cam follower is mounted. The arcuate channel passes directly over the fulcrum of the lever and extends to the end of the arm. A link 250 is mounted at one end near the center of a gear segment 251 by a screw 252. Screw 252 has a shoulder of sufficient height to allow link 250 to turn on it when it is tight. A follower 253 (see Fig. 18) is attached at the other end of link 250 and fits snugly into the arcuate channel 249. The radius of curvature of channel 249 is equal to the distance between the center of follower 253 and the center of screw 252, and its center of curvature coincides with the center of screw 252 when cam follower 242 is at the mid-point of the range of travel imposed on it by cam 223 so that follower 253 can be moved to any position in the arcuate channel 249. Gear segment 251 is supported for rotation near one end on a shaft 254 mounted in the support plate 207. The teeth at the opposite end of the gear segment 251 engage a gear 255 which is a part of a one-way clutch which is made up of an inner clutch member 230, previously referred to, and balls 256 and gear 255. This structure is mounted above gear 228. The purpose of the clutch is to allow shaft 229 to turn in a counterclockwise direction, but not in a clockwise direction, when gear 255 is held stationary. Consequently, a counter-clockwise motion of gear 255 will turn shaft 229 in a counter-clockwise direction, thereby advancing the film 231 across the aperture, but a clockwise motion of gear 255 will not turn shaft 229.

Figure 18:
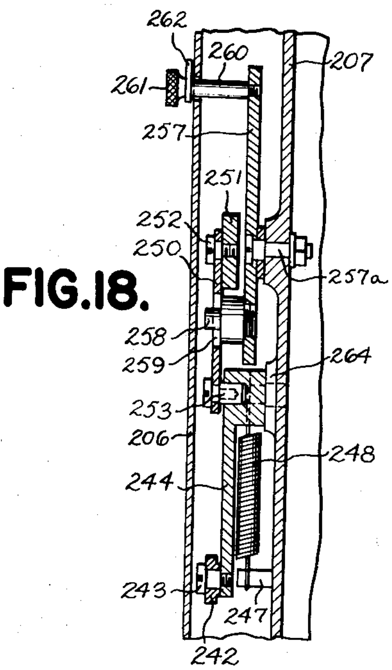
Fig. 18 is a partial vertical section taken along the line 18—18 of Fig. 16 showing the means for adjusting the ratio of the variable ratio lever.

Referring to Fig. 18, a lever 257 is supported for rotation near its center on a bolt 257*a* which is mounted on the support plate 207 at a point directly beneath screw 252. Near one end of lever 257 a pin 258 is mounted which extends upward and fits in a slot 259 cut lengthwise in link 250 near its center. A pin 260 is mounted vertically in lever 257 near its other end. Pin 260 extends upward through a slot cut in the cover plate 206. A knob 261 and a pointer 262 are attached to the end of pin 260 above the cover plate after it has been put in place. A scale 263 is marked on the cover plate next to the slot through which pin 260 extends. Thus, follower 253 may be adjusted to any position in the arcuate channel 249 from the outside of the camera by moving knob 261 which turns lever 257, thereby turning link 250 by means of pin 258.

When the camera is in operation a rocking motion is induced in the variable ratio lever 244 by the action of cam 223 and spring 246. If follower 253 is directly above bearing 245, the fulcrum of the variable ratio lever, no motion is transmitted by link 250 to gear segment 251 by the action of the variable ratio lever, and gear segment 251 is held stationary. When follower 253 is in any position in the arcuate channel to the right of bearing 245 (Fig. 16) a reciprocating motion is imparted to gear segment 251 through link 250. Gear segment 251, in turn, imparts a rotary reciprocating motion to gear 255. Cam 223 is shaped so that the reciprocating motion imparted to gear 255 consists of a counter-clockwise motion of constant angular velocity during a substantial portion of the period of rotation of the cam. The magnitude of this velocity is proportional to the ratio of the distances from bearing 245 to the follower 253 and from said bearing 245 to the cam follower 242. Since gear 255 is connected to shaft 229 and the film drive sprocket drum 240 by the one-way clutch 256, a motion of uniform velocity of magnitude determined by the position of lever 257 is imparted to the film during a portion of the period of rotation of cam 223. The timing of gear 217 and of the gears coupling shafts 219 and 219A is so arranged that the motion of uniform velocity of the film occurs during the exposure portion of the shutter cycle. During the remainder of the shutter cycle the action of cam 223 on lever 244 decreases the angular velocity of shaft 229 and the sprocket drum 233 through gear 255 and its clutch 256 until it is overtaken by gear 228 acting through its clutch 230 as a result of the intermittent movement of gear 226 imposed on it by the driving pin 222. While gear 228 is advancing the film one frame between exposures, the action of cam 223 and spring 246 returns gear 255 in a clockwise direction to its original position and then accelerates it to a uniform velocity in the counter-clockwise direction again. When the film has been advanced one frame by the action of gear 228, that gear is overtaken by gear 255, which moves the film at a uniform velocity while the next shutter exposure is being made. As previously mentioned, the magnitude of the uniform velocity of the film during the exposure may be continuously varied from zero to a maximum value by adjustment of the position of follower 253 in the arcuate channel 249. This may be accomplished from the outside of the camera by moving knob 261, as above stated, and the scale 263 marked on the outside of the camera may therefore be calibrated directly in terms of velocity of the image motion compensating movement imparted to the film for any position of the pointer 262.

Upon a consideration of the operation of the camera just described, it will be apparent that the distance between corresponding points in adjacent frames on the film is equal to the sum of the distance the film is advanced between exposures by the Geneva-type intermittent movement and the distance the film is advanced during the exposure portion of the shutter cycle by the image motion compensation mechanism. Therefore, the distance between corresponding points in adjacent frames is dependent on the setting of the image motion compensation control lever 257, while the unexposed section of the film between the exposures will be the same width in every case.

In certain applications it may be desired to maintain a constant distance between corresponding points in adjacent frames regardless of the amount of image motion compensating movement. Cameras using a variable ratio lever to transmit image motion compensating movement to the film can readily be constructed to obtain this result. A typical camera making use of the invention to produce an image motion compensating movement of the film during exposure, in which the distance between corresponding points in adjacent frames on the film is independent of the setting of the image motion compensation control, is shown by way of example in Figs. 19, 20, and 21.

This camera is essentially the same in construction and operation as the camera just described, with the exception that the image motion compensating movement is transmitted to the film drive sprocket drum by a parallelogram-type differential gear train, rather than by a gear sector and one-way clutches.

Figures 19, 20, 21:
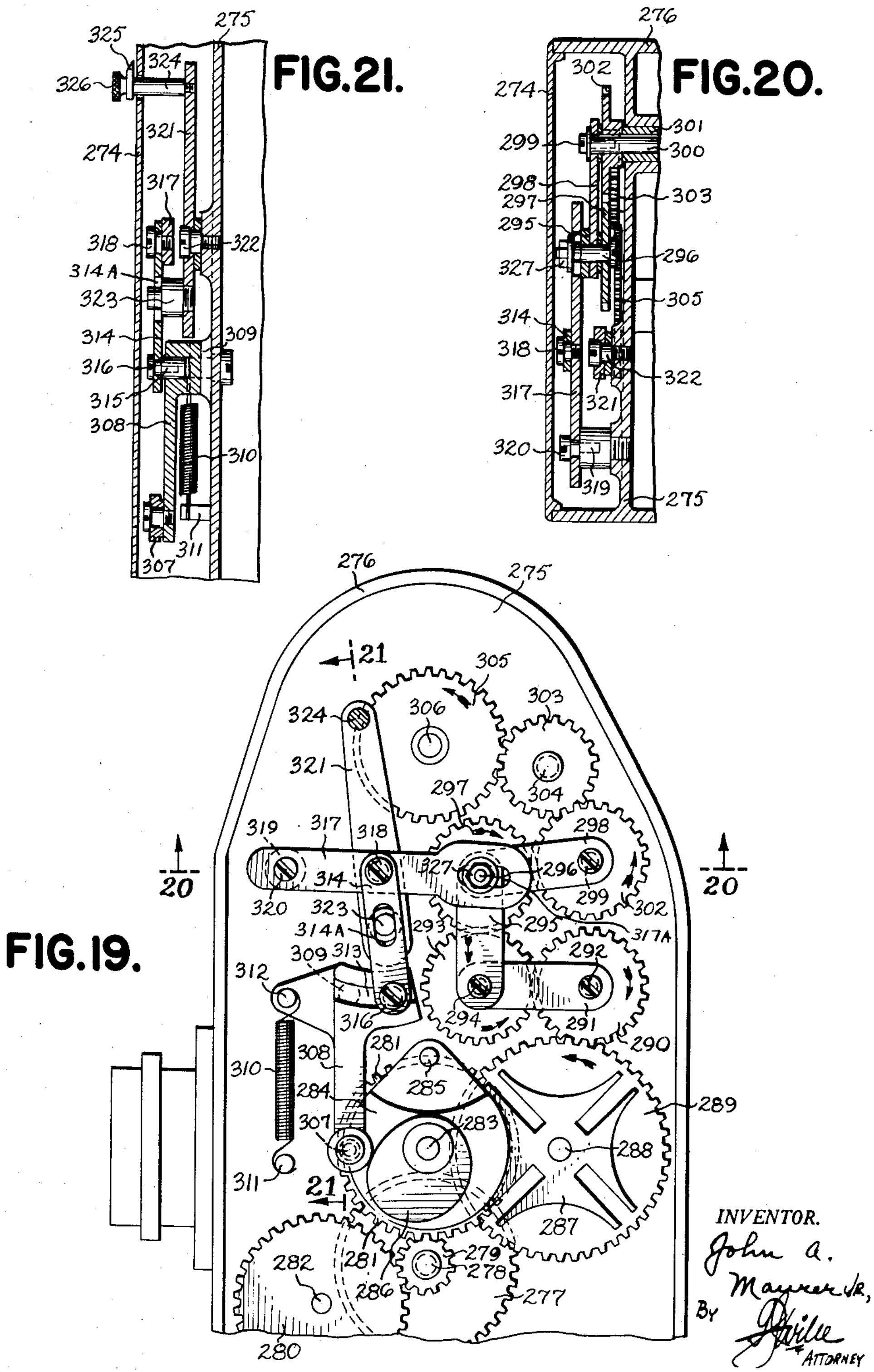
Fig. 19 is a partial plan view with the cover plate removed of a still camera similar to that shown in Fig. 16, but with alternate means for transmitting an image motion compensating movement to the film.
Fig. 20 is a partial vertical section taken along the line 20—20 of Fig. 19 showing the means for transmitting the compensating motion to the film.
Fig. 21 is a partial vertical section taken along the line 21—21 of Fig. 19, showing the means for adjusting the ratio of the variable ratio lever.

Fig. 19 shows the top of the camera with the cover plate 274 removed. In this camera the operating mechanism is supported on a plate 275 rigidly attached to the sides of the camera body 276. A drive motor imparts rotational motion to gear 277 through a train of reduction gears. Gear 277 is mounted on a shaft 278 which is supported on the mechanism plate 275. A pinion 279 is securely attached to shaft 278 at a point above gear 277 and engages two gears 280 and 281. Gear 280 is mounted on a shaft 282 which extends down through the support plate 275 and is rotatably supported by a bearing mounted therein. At its lower end shaft 282 is geared to the camera shutter. This gearing is so arranged that the shutter makes one exposure for each rotation of gear 280. Gear 281 is mounted on a shaft 283 which is rotatably supported on plate 275. A driving wheel 284 of a Geneva-type intermittent mechanism is mounted on shaft 283 at a point above gear 281. A driving pin 285 is mounted in a vertical position on the driving wheel near its periphery. A cam 286 is also mounted on shaft 283 at a point above the driving wheel 284.

A four-pointed star wheel 287 is mounted on a shaft 288 which is supported for rotation on the support plate. A gear 289 is mounted on shaft 288 at a point below the star wheel. Gear 289 meshes with a gear 290 which is rotatably supported on a post mounted vertically in the support plate. A link 291 is supported near one end at the top of the post by a screw 292. Screw 292 allows link 291 to be turned on its supporting post. A gear 293 is supported for rotation on a pin 294 which is mounted in link 291 near its other end. Gear 293 is mounted below link 291 and meshes with gear 290. Pin 294 extends above link 291 and rotatably supports another link 295 near one end. Link 295 has a shaft 296 mounted vertically in it near its other end. A gear 297 which engages gear 293 is rotatably supported on shaft 296 at a point below link 295 (as shown in Fig. 20). Another link 298 is rotatably supported near one end of shaft 296 between gear 297 and link 295. Near its other end link 298 is rotatably supported by a screw 299 at the top of a shaft 300. Shaft 300 extends down through the support plate to the bottom of the camera and is supported for rotation by a bearing 301 mounted in the support plate 275 (see Fig. 20) and a like bearing mounted in the bottom of the camera. A film drive sprocket drum (not here shown, but similar to drum 233 on shaft 229 of Fig. 17) is mounted on shaft 300 below the support plate. The sprockets on this drum engage sprocket holes in the film (not shown here, but see 234 in Fig. 16) and advance it across the exposure plane when shaft 300 is rotated in a counter-clockwise direction. Gear 297 meshes with a gear 302 which is secured to shaft 300 at a point above the support plate. Gear 302 engages an idler gear 303 mounted on a shaft 304 which is supported for rotation in the support plate 275. Gear 303 meshes with a gear 305 mounted on a shaft 306 which extends down through the support plate and is supported for rotation by a bearing mounted therein. A film spool spindle (not shown, but see, generally, 239, 240 and 241 of Fig. 16) is mounted for rotation on shaft 306 below plate 275 and is connected to shaft 306 by a friction clutch. This spindle engages a film take-up spool onto which the film is wound after it has been exposed by a counter-clockwise rotation of shaft 306.

When the camera is in operation the drive motor imparts a counter-clockwise rotational motion to shaft 278 and pinion 279. Pinion 279 drives the shutter through gear 280 and shaft 282. Gear 281 is rotated in a counter-clockwise direction by pinion 279, thereby turning shaft 283, driving wheel 284, and cam 286 in a clockwise direction. Driving pin 285 successively engages each of the slots in the four-pointed star wheel 287 thereby turning the star wheel and gear 289 intermittently in a counter-clockwise direction. When the parallelogram-type differential, consisting of links 291, 295, and 298, is held stationary the intermittent counter-clockwise motion of gear 289 is transmitted by gears 290, 293, 297, and 302 to shaft 300 and the sprocket drum mounted on it, thereby advancing the film intermittently across the exposure plane toward the film take-up spool. The gearing is arranged so that the film is advanced one frame for each quarter turn of gear 289. The intermittent counter-clockwise motion of gear 302 is transmitted to the take-up spool by gears 303 and 305, shaft 306, and the friction clutch and spindle mounted on shaft 306. The gearing is arranged so that the counter-clockwise rotation of the take-up spool during each quarter turn of gear 289 is more than sufficient to wind onto the spool the length of film advanced by the sprocket drum mounted on shaft 300. The friction clutch allows shaft 306 to slip inside the spindle when the film has been wound tightly on the take-up spool.

Gears 280 and 281 have the same number of teeth so that the film is advanced one frame for each exposure of the shutter. The timing of these gears is arranged so that the exposure portion of the shutter cycle occurs at a time when the star wheel 287 is held stationary, so that the frame-to-frame advancing of the film takes place at a time when the shutter is closed.

A cam follower 307 is mounted near one end of a crank-arm type lever 308. Lever 308 is a variable ratio lever, with its fulcrum at bearing 309, which is mounted in the support plate 275. A spring 310 is attached at one end to a pin 311 which is mounted vertically in the support plate, and at its other end to a pin 312 which is mounted vertically on lever 308. Spring 310 holds the cam follower 307 against the cam 286. An arcuate channel 313 is cut in the arm of lever 308 which is perpendicular to the arm on which the cam follower is mounted. The arcuate channel passes directly over the fulcrum of the lever and extends to the end of the arm. A link 314 has a follower 315 mounted on it near one end by a screw 316. Follower 315 fits snugly into channel 313 and may be moved from one end of the channel to the other. Near its other end link 314 is supported for rotation near the center of an arm 317 by a screw 318. The radius of curvature of channel 313 is equal to the distance from the follower 315 to screw 318, and its center of curvature coincides with the center of screw 318 when cam follower 307 is at the midpoint of the range of travel imposed on it by cam 286 and spring 310. Arm 317 is supported for rotation on a post 319 mounted vertically in the support plate 275 by a screw 320. Near its other end arm 317 has a lengthwise slot 317a, which engages shaft 296 at a point above link 295. A nut 327 at the end of shaft 296 prevents any vertical motion of arm 317 on shaft 296, but allows the shaft to be rotated or moved back and forth in the slot. The position of link 295 and gears 293 and 297 in the parallelogram-type differential may thus be controlled by arm 317. When gear 290 is held stationary, a motion of link 295 and gears 293 and 297 toward the center of the camera will cause gear 293 to rotate in a counter-clockwise direction, thus turning gear 297 in a clockwise direction. The clockwise rotation and the lateral motion of gear 297 turn gear 302 and the sprocket drum in a counter-clockwise direction, advancing the film across the exposure plane.

As gear 281 rotates, a reciprocating motion is imparted to lever 308 by the action of cam 286 and spring 310. When follower 315 is in a position in the arcuate channel 313 directly above the fulcrum, at bearing 309, no motion is transmitted to arm 317 by link 314 and the differential system is held stationary. When the follower 315 is in any other position in the arcuate channel a reciprocating motion will be transmitted to arm 317 and to the parallelogram-type differential by link 314. The amplitude and velocity of this motion are proportional to the ratio of the distances from bearing 309 to follower 315 in the arcuate channel and to the cam follower 307. The orientation of cam 286 on shaft 283 with respect to the driving wheel 284 is arranged so that the reciprocating motion transmitted to link 295 and gears 293 and 297 by arm 317 consists of a motion toward the center of the camera when gear 289 is not turning, and a motion away from the center of the camera when the star wheel 287 and gear 289 are being turned by the driving pin 285. In this way the sprocket drum on shaft 300 is turned in the counter-clockwise direction by the action of cam 286, thus imparting linear motion to the film in the direction of the take-up spool during the exposure portion of the shutter cycle. Cam 286 is shaped so that this linear motion imparted to the film is of uniform velocity during the film exposure.

Since the motion of link 295 in the direction away from the center of the camera occurs while the film is being advanced by the intermittent mechanism, the amplitude of the counter-clockwise motion of the film drive sprocket drum resulting from the rotation of gear 289 will be reduced by the return motion of link 295 away from the center of the camera. As a result the length of film advanced between exposures is less than the frame-to-frame spacing by the length of film advanced during the exposure by the motion of gears 293 and 297 toward the center of the camera. Consequently, the length of film advanced during one complete exposure cycle is constant. Therefore, the distance between corresponding points on adjacent frames is the same regardless of the amount of image motion compensating movement imparted to the film during the exposure.

As previously mentioned, the velocity of the motion imparted to the film during the exposure is uniform, and the magnitude of this velocity is dependent upon the position of follower 315 in channel 313. The velocity of the image motion compensating movement may be continuously varied from zero to a maximum value by moving the follower from a position over the fulcrum of lever 308 to the end of the channel. The velocity of the compensating motion of the film may thus be set to correspond with velocity of any image motion resulting from a relative motion of the camera and the object being photographed by rotating link 314 to put follower 315 in the desired position in channel 313. Referring to Fig. 21, a lever 321 is supported for rotation by a screw 322 mounted in the support plate at a point directly beneath screw 318. Lever 321 extends horizontally beneath link 314 and has a pin 323 mounted in it which extends upward and engages a slot **314*a* cut lengthwise in link 314 near its center. This slot allows link 314 to move back and forth over pin 323, transmitting a reciprocating motion to arm 317 without changing the position of follower 315 in channel 313. Near its other end lever 321 has a post 324 mounted vertically on it. Post 324 extends upward through a slot cut in the cover plate 274 and has a pointer 325 and a knob 326 mounted on it at its upper end. The position of follower 315 in channel 313 and, consequently, the velocity of the compensating motion imparted to the film during the exposure can be controlled by rotating lever 321. This can be accomplished from the outside of the camera by moving knob 326. A scale is marked on the camera cover plate 274 next to the pointer 325. This scale may be calibrated directly in terms of velocity of the image motion compensating movement imparted to the film during the exposure for any position of knob 326**.

What I claim is:

1. In a camera having a shutter adapted to provide exposure periods and a film feeding mechanism which includes a selectively actuated rotatable film advancing roller, the combination of a rotatable cam, a cam follower engaging the cam, a gear coaxially with the film advancing roller, a gear driven mechanical clutch interconnecting the roller and the gear, a gear segment pivoted at its not-toothed end for reciprocating movement and having its toothed end meshing with the gear so that on movement in one direction the clutch engages the gear to the roller rotating the roller while on movement in the other direction the clutch disengages the gear from the roller stopping the roller, and a variable ratio lever connected to the cam follower at a first point and to the gear segment at a second point, the variable ratio applying between the first and second points, the cam effecting the reciprocating movement of the gear segment through the lever during the interval of the exposure periods.

2. In a camera having a shutter adapted to provide successive exposure periods and a film feeding mechanism which includes a rotatably mounted film advancing roller, the combination of a first gear rotatably mounted coaxially with the film advancing roller, a first unidirectional clutch operatively connecting the first gear and the roller, a second gear rotatably mounted coaxially with the film advancing roller and the first gear, a second unidirectional clutch operatively connecting the second gear and the roller, a driven rotatable shaft, a pin carried by the rotatable shaft eccentrically thereof, a rotatable star wheel engageable by the pin, a third gear coaxial with the star wheel and meshing with the first gear, a cam integral with the rotatable shaft, a cam follower engaging the cam, a lever system having the cam follower at one end and including a gear segment at its other end, the segment meshing with the second gear, the first gear rotating the roller in the film feeding direction only between exposure periods and the second gear rotating the roller in such direction within the exposure periods.

3. In a camera having a shutter adapted to provide successive exposure periods and a film feeding mechanism which includes a film advancing roller, a first means for intermittently imparting motion to the film advancing roller comprising a pin carried by a rotatable shaft for movement in a circular path, a rotatable star wheel engageable by the pin, a first gear coaxial with the roller and in driving connection with the star wheel, and a first unidirectional clutch operatively connecting the first gear and the roller, and a second means for intermittently imparting rotary motion to the film advancing roller comprising a cam mounted on the rotatable shaft, a cam follower engaging the cam, a variable ratio lever carrying the cam follower at one of its ends and terminating in a gear segment at its other end, a second gear mounted coaxially with the film advancing roller and the first gear and in mesh with the gear segment, and a second unidirectional clutch for operatively connecting the second gear and the film advancing roller, the motion of the film advancing roller by the first means occurring between exposure periods, the motion of the film advancing roller by the second means covering the exposure periods, both motions being in the same direction.

References Cited in the file of this patent

UNITED STATES PATENTS

| | | |
|---|---|---|
| 1,115,000 | Martin | Oct. 27, 1914 |
| 2,260,569 | Holmes | Oct. 28, 1941 |
| 2,333,768 | Davies et al. | Nov. 9, 1943 |
| 2,403,587 | Doyle et al. | July 9, 1946 |
| 2,424,989 | Koepfer | Aug. 5, 1947 |
| 2,474,323 | Rattray | June 28, 1949 |
| 2,478,679 | Bartelson | Aug. 9, 1949 |
| 2,512,486 | Craig et al. | June 20, 1950 |
| 2,796,009 | Doyle et al. | June 18, 1957 |